[12] United States Patent
Davis

(10) Patent No.: US 11,423,305 B2
(45) Date of Patent: Aug. 23, 2022

(54) NETWORK-BASED WORK MACHINE SOFTWARE OPTIMIZATION

(71) Applicant: Deere & Company, Moline, IL (US)

(72) Inventor: Travis J. Davis, Polk City, IA (US)

(73) Assignee: DEERE & COMPANY, Moline, IL (US)

(*) Notice: Subject to any disclaimer, the term of this patent is extended or adjusted under 35 U.S.C. 154(b) by 375 days.

(21) Appl. No.: 16/802,291

(22) Filed: Feb. 26, 2020

(65) Prior Publication Data
US 2021/0264252 A1 Aug. 26, 2021

(51) Int. Cl.
*G06N 3/08* (2006.01)
*G06F 8/60* (2018.01)

(52) U.S. Cl.
CPC .......... *G06N 3/08* (2013.01); *G06F 8/60* (2013.01)

(58) Field of Classification Search
CPC .............. G06N 3/08; G06F 8/60; A01B 76/00
See application file for complete search history.

(56) References Cited

U.S. PATENT DOCUMENTS

| 7,813,822 B1* | 10/2010 | Hoffberg | H04N 7/163 |
| | | | 381/73.1 |
| 10,395,444 B1 | 8/2019 | Eden et al. | |
| 10,853,894 B2* | 12/2020 | Rupp | G06F 16/9535 |
| 11,068,935 B1* | 7/2021 | White | G06F 16/958 |
| 11,073,843 B2* | 7/2021 | Kaechi | G06Q 50/02 |
| 11,232,554 B1* | 1/2022 | Do | G06N 3/08 |
| 2003/0037328 A1* | 2/2003 | Cicciarelli | G06F 8/60 |
| | | | 717/170 |
| 2017/0109584 A1* | 4/2017 | Yao | G06V 20/47 |
| 2018/0150704 A1* | 5/2018 | Lee | G06V 10/82 |

(Continued)

FOREIGN PATENT DOCUMENTS

| EP | 2132971 A1 | 12/2009 |
| EP | 3192344 A1 | 7/2017 |
| EP | 3340130 A1 | 6/2018 |

OTHER PUBLICATIONS

Extended European Search Report and Written Opinion issued in European Patent Application No. 21152824.5, dated Jul. 8, 2021, in 08 pages.

*Primary Examiner* — Michael B. Pierorazio
(74) *Attorney, Agent, or Firm* — Klintworth & Rozenblat IP LLP

(57) ABSTRACT

Systems and methods enabling network-based work machine software optimization may be carried-out by a server end in communication with a plurality of work machines over a network. In embodiments, the method includes: (i) storing a software solution database containing a plurality of software solutions corresponding to different work machine task profiles; (ii) receiving, at the server end, a software solution request containing task-specific data from a first work machine in the plurality of work machines; and (iii) searching the software solution database for an optimal-fit software solution corresponding to the task-specific data. If locating an optimal-fit software solution, the server end (iv) avails the first work machine of the optimal-fit software solution via the network. If not locating an optimal-fit software solution within the software solution database, the server end (v) transmits a corresponding message over the network and to the first work machine.

20 Claims, 7 Drawing Sheets

(56) References Cited

U.S. PATENT DOCUMENTS

| | | |
|---|---|---|
| 2018/0268287 A1 | 9/2018 | Johansen et al. |
| 2018/0271015 A1 | 9/2018 | Redden et al. |
| 2018/0284735 A1 | 10/2018 | Cella et al. |
| 2018/0284742 A1 | 10/2018 | Cella et al. |
| 2018/0307211 A1* | 10/2018 | Aizawa ............ G05B 19/4083 |
| 2019/0108618 A1* | 4/2019 | Hwang ................ G06T 3/4015 |
| 2019/0196417 A1* | 6/2019 | Uno .................. G05B 13/0265 |
| 2020/0093053 A1* | 3/2020 | Ehlert .................. A01B 79/005 |
| 2020/0111578 A1* | 4/2020 | Koblick ................ G16H 20/10 |
| 2020/0211674 A1* | 7/2020 | Israeli .................... G16B 30/00 |
| 2021/0081837 A1* | 3/2021 | Polled ...................... G06F 8/41 |
| 2021/0133938 A1* | 5/2021 | Lee ......................... G06N 3/006 |
| 2021/0166350 A1* | 6/2021 | Wang .................... G06T 3/4053 |
| 2021/0192337 A1* | 6/2021 | Loh .......................... G06N 3/063 |
| 2021/0233511 A1* | 7/2021 | Li ............................ G10L 15/02 |
| 2021/0263527 A1* | 8/2021 | Yazhemsky ............. G06N 3/04 |
| 2021/0264252 A1* | 8/2021 | Davis ..................... G06Q 50/02 |
| 2021/0287297 A1* | 9/2021 | Hayward .............. G06V 30/274 |
| 2021/0365712 A1* | 11/2021 | Lu .......................... G06V 20/58 |

\* cited by examiner

NETWORK-BASED WORK MACHINE SOFTWARE OPTIMIZATION

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to systems and methods supporting network-based work machine software optimization through the provision of task-specific software solutions, such as tailored neural network algorithms, to work vehicles and other work machines.

BACKGROUND OF THE DISCLOSURE

Work machines are typically manually controlled by an operator from one or more operator stations onboard the work machine, although automated and autonomous work machines are becoming increasingly prevalent in certain contexts. For more complex tasks, software programs or algorithms are employed to improve performance or to otherwise enhance operational aspects of the work machine. As a first example, agricultural harvesters or combines are now commonly equipped with grain quality assessment systems, which implement software programs to assess grain quality in real-time as the combine is moved across a field and processes harvested crops. As a second example, certain agricultural combines, tractors, and other agricultural work vehicles now have row following functionalities, which utilize vision systems or other sensors to monitor and guide the work vehicle relative to the crop rows processed by the work vehicle. Numerous other examples exist across the agricultural, construction, forestry, and mining industries of work machines having functions partially or fully automated utilizing software algorithms. Generally, the provision of such software algorithms improves work machine performance and efficiency when carrying-out a particular work task. It is thus now common for algorithms to be loaded onto work machines as part of a software package or suite at the time of original manufacture. The software algorithms may then be subsequently modified via software updates distributed over a network connection including, for example, a local area network (LAN) providing access to the Internet and a backend service dedicated to furnishing software updates.

SUMMARY OF THE DISCLOSURE

Methods are provided enabling network-based work machine software optimization through the development and provision of tailored, task-specific software solutions to work vehicles and other work machines. Embodiments of the method may be conducted by a server end in communication with a plurality of work machines over a network. In various implementations, the method includes the steps or processes of: (i) storing, in a memory accessible to the server end, a software solution database containing a plurality of software solutions corresponding to different work machine task profiles; (ii) receiving, at the server end, a software solution request transmitted over the network from a first work machine included in the plurality of work machines, the software solution request including task-specific data collected by the first work machine and pertaining to a work task performed utilizing the first work machine; and (iii) searching the software solution database for an optimal-fit software solution corresponding to the task-specific data. If locating an optimal-fit software solution within the software solution database, the server end further (iv) via the network connection, avails the first work machine of the optimal-fit software solution for usage by the first work machine when performing the work task. Alternatively, if not locating an optimal-fit software solution within the software solution database, the server end instead (v) transmits a message over the network and to the first work machine indicating that an optimal-fit software solution is unavailable for the work task.

Work machines are further provided for performing network-based work machine software optimization through interactions with a server end over a network. In embodiments, the work machine includes an operator interface located within an operator station, a display device operable within the operator station, and a controller architecture coupled to the operator interface and to the display device. A network interface is coupled to the controller architecture and enables the controller architecture to communicate with the server end over the network. A memory stores computer-readable instructions that, when executed by the controller architecture, causes the work machine to: (i) monitor for a trigger event initiating generation of a software solution request; (ii) when detecting the trigger event, utilize the network interface to transmit a software solution request over the network and to the server end, the software solution request including task-specific data pertaining to a work task performed utilizing the work machine; (iii) in response to transmission of the software solution request, receive a reply message from the server end indicating whether an optimal-fit software solution corresponding to the task-specific data is available; and (iv) if the reply indicates that an optimal-fit software solution corresponding to the task-specific data is available, utilize the optimal-fit software solution during performance of the work task.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
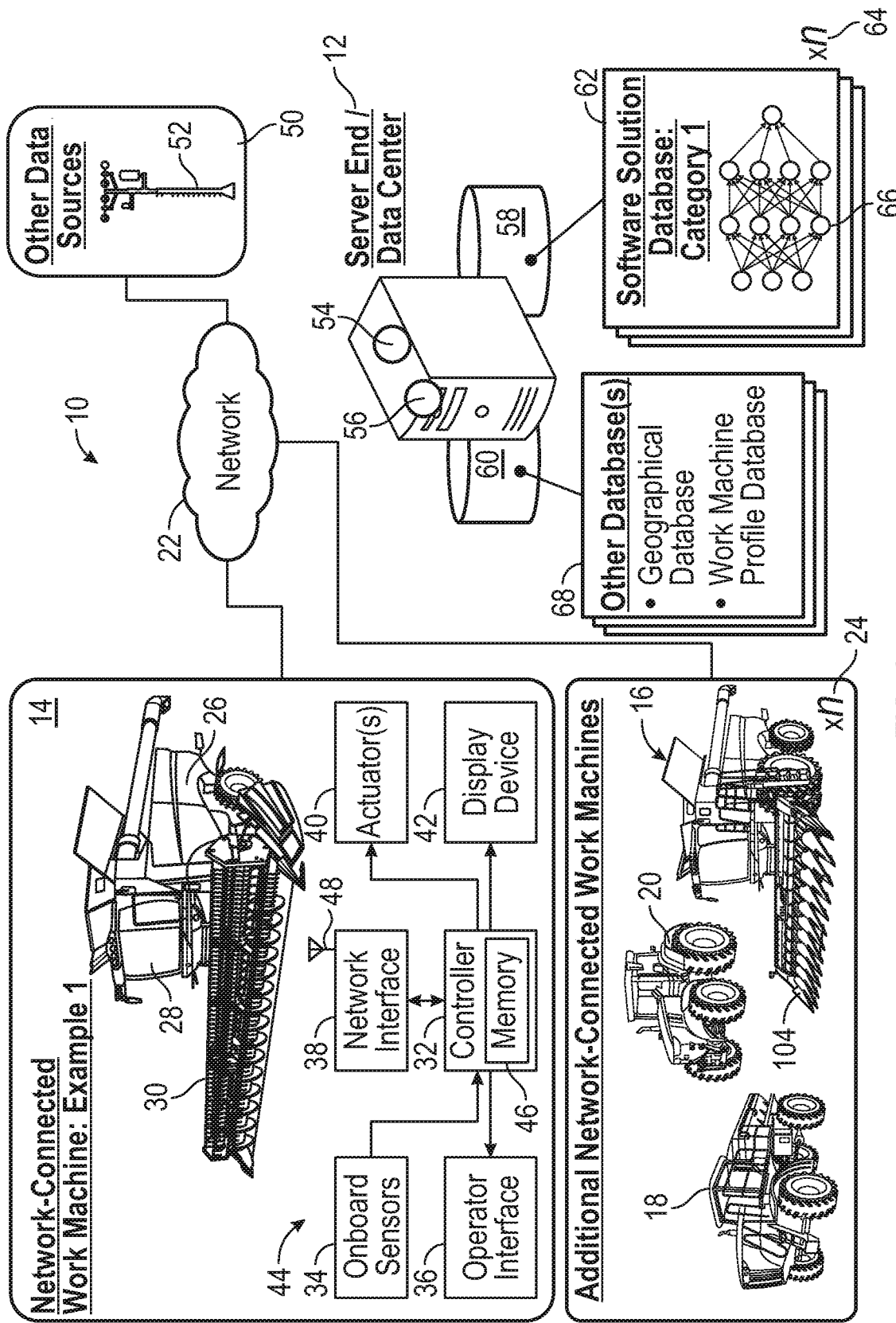
FIG. 1 illustrates a work machine-server architecture including a server end, a software solution database accessible to the server end, and multiple network-connected work machines suitable for performing embodiments of the work machine software optimization method, as illustrated in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

As discussed above, software programs or algorithms are often executed by control systems onboard work machines to assist in performing work tasks in the agricultural, forestry, construction, and mining industries. Such software algorithms may be tailored or specialized, to various extents, for usage in conjunction with specific work machine platforms, such as work vehicles of a particular make and model. Additionally, in certain cases, such software algorithms may enable operators to input or adjust various parameters to refine the behavior of a software algorithm. This notwithstanding, practical limit the degree to which such software algorithms can be specialized or tailored given the general need to develop relatively universal algorithms capable of provide adequate performance for a large number of work machines operated in a wide range of dynamic, real-world conditions. While a spectrum of specialized software algorithms can be loaded onto a particular type of work vehicle can, such an approach consumes local memory and adds complexity in selecting the appropriate software solution for usage. Similarly, it is also possible to design a software algorithm enabling the adjustment of various input parameters, which an operator may then utilized to fine tune the behavior of an algorithm as desired. However, again, such an approach is limited in multiple respects, creates undesirable levels of complexity, and tends to exacerbate an operator's mental workload.

The recent emergence of algorithms capable of developing specialization through machine learning, most notably neural network algorithms, may provide a partial solution to such issues. However, the degree to which such neural network algorithms (or other machine learning algorithms) may adapt and specialize over time is linked to a tradeoff in training. After deployment onboard a particular work machine, the performance of a given neural network algorithm may improve over time with additional data; however, the pace of such learning may be undesirably slow and result in relatively poor adaptability given the relatively limited data sets encountered in the context of a single work machine performing a limited number of tasks iterations. While a wider data set with a greater number of data instances can be utilized to train a neural network algorithms prior to in-field deployment, such a wide data set tends to yield a relatively universal algorithm unlikely to satisfy work machine needs and operator expectations across a relatively expansive (national and global) footprint.

There thus exists an ongoing demand for the development of systems and methods overcoming the above-noted technical challenges relating to the specialization of software algorithms facilitating the performance of industrial work tasks by work vehicles and other non-vehicular work machines. In satisfaction of this ongoing demand, the following sets-forth systems and methods for providing network-based work machine software optimization through the development and in-field provision of tailored, task-specific software solutions to work machines. In particular, the systems and methods described herein assist in the distribution, development, and implementation of highly tailored or "optimal-fit" software solutions adapted to satisfy the unique needs of work machines distributed across a geographical area, such as a single country (e.g., the United States), multiple countries, or the globe. Such software solutions can assume the form of relatively simple software programs, such as applets; or, perhaps, may include optimized sets of parameters for automatic entry by a work machine control system into an algorithm or software program executed when performing a work task. More commonly, however, the software solutions will assume the form of more complex software programs or algorithms. In this latter instance, the software solutions are advantageously realized as neural network algorithms or other machine learning algorithms in embodiments, which may be iteratively or continually trained utilizing an expansive pool of training data collected by a server end in communication with a relatively large number of network-connected work machines.

As just indicated, aspects of the methods described herein may be carried-out by a server end in communication with a plurality of work machines over a network. In addition the ability to exchange data with the work machines via the network, the server end can also access a software solution database storing a relatively vast library of software solutions. The software solutions each correspond to a particular work machine task profile, which describes key parameters pertaining to a work task. Such key parameters can include data descriptors of the work task itself, descriptors of the geographical region in which the work task is performed, and descriptors of a category of work machine (e.g., a make, model, or series number of a work vehicle) utilized to perform the work task. In addition to the software solution database, the server end may also maintain other databases useful in performing the below-described software optimization and distribution functions. Such additional databases may include, for example, a geographical database storing task-relevant information for different regions or zones of geographical area and/or a work machine profile database storing work machine profiles containing descriptive information pertaining to work vehicles for which such profiles have been created.

During operation, the server end receives software solution requests from work machines when, for example, the work machines are deployed in-field or otherwise in customer possession. Each software solution request is, in essence, a transmission received by the server end, routed through the network, and originating from a work machine (or, more specifically, a control system onboard the work machine) seeking a software solution for an impending or current work task carried-out utilizing the work machine. The work machine packages the software solution request to include certain task-pertinent information or task-specific data; that is, data gathered by the work machine issuing the request and describing parameters of the work task for which a software solution is sought. The information contained in the task-specific data will vary depending upon the characteristics of the work machine and work task at issue. However, by way of example, the task-specific data can include data entered by an operator of the work machine into an interface or system of the work machine; e.g., the operator of a work vehicle may interact with a GUI screen to enter data describing work task parameters or the environment in which the work task is performed. Additionally or alternatively, the task-specific data may include sensor readings or input collected by sensors onboard the work machine; the term "sensors" encompassing, among other types of sensors, cameras capturing imagery in the visible or infrared portions of the electromagnetic spectrum. The task-specific data may also include various other bits of information usefully known in identifying a software solution well-suited for the work task at issue including, for example, data pertaining to the work machine itself. For example, in this latter regard, the work machine (when assuming the form of a work vehicle) may include a Vehicle Identification Number (VIN) or other such data uniquely identifying the work vehicle.

After receipt of a particular software solution request, the server end extracts the task-specific data for usage constructing a set of search criteria. Further, in certain instances, the server end may also supplement the search criteria with additional information not expressly contained in the software solution request. In this latter regard, the server end may generate the search criteria to include a geographical origin of the software solution request, which may be specified in the request or instead determined from geo-tagged metadata, the general location of an Internet Protocol (IP) address, or the like. Similarly, machine-specific data contained in the work machine profile database may be recalled utilizing identifying information extracted from the software solution request, with such machine-specific data then utilized in constructing the search criteria. As a still further possibility, data provided by other network-connected sources, such as Internet-accessible weather stations if applicable, may also be considered by the server end in constructing or refining the search criteria. After the search criteria is established, the server end may then utilize the search criteria to search the software solution database for an optimal-fit software solution corresponding to the search criteria. If locating an optimal-fit software solution within the software solution database, the server end then avails the work machine of the optimal-fit software solution for usage by the work machine when performing the work task. Conversely, if not locating an optimal-fit software solution within the software solution database, the server end transmits a message over the network and to the work machine indicating that an optimal-fit software solution is presently unavailable. In this latter instance, the work machine may then perform the task without usage of a software solution. Alternatively, the work machine control system may instead execute, by default, a baseline algorithm stored in local memory when performing the work task.

A software solution is considered an "optimal-fit software solution" when an adequate match is found between the search criteria and the work machine task profile corresponding to the software solution. The tolerance or sensitivity for deeming a software solution an optimal-fit will vary among embodiments. In some implementations, a software solution may be required to match higher level (primary) search criteria (e.g., describing machine type, implement type, and crop type), while matching a certain percentage or fraction of lower level (secondary or tertiary) search criteria (e.g., describing machine series, crop varietal, season or growth state, and/or geographic location) to qualify as an optimal-fit software solution. In other instances, matches between the search criteria and the work machine task profile may be weighted, and a total score may be calculated by the server end. If the total score exceeds an upper predetermined threshold, the software solution may be deemed an optimal-fit software solution. In certain cases, if the total score is less than the upper predetermined threshold, but greater than a second, lower threshold, the software solution may be deemed an approximate-fit software solution, as described more fully below.

When locating an optimal-fit software solution in the software solution database, the server end may then avail the work machine of the software solution via the network connection. The server end can avail a given work machine of an optimal-fit software solution (or an approximate-fit software solution) over the network by transmitting the software solution to the work machine for download to an onboard memory and local execution by the work machine at the appropriate juncture or junctures in time. In this case, the software download may occur immediately or shortly after the optimal-fit software solution is located within the software solution database. In other instances, the start time of the work task permitting, the work machine may schedule a download and installation for a subsequent time when, for example, the work machine is not in use and located in a storage area having a persistent network (e.g., WiFi) connection. In other instances, if network-connectivity and response times permit, the software solution may execute at the server end, with the server end then providing instructions to the work machine generated by the software solution over the network to avail the work machine of the optimal-fit software solution. For example, in this latter instance, the software solution may be availed utilizing a software-as-a-service (SAAS) approach, which may be beneficial in instances in which the software solution has relatively high processing demands and is better performed by the server or servers forming the server end, while network latencies are relatively low. In yet other embodiments, a blended approach may be followed in which an optimal-fit software solution is availed by server end, with certain aspects of the software solution performed by the work machine and other aspects of the software solution performed at the server end. For example, in this latter case, the work machine may principally execute the optimal-fit software solution locally, while, when certain high processing load or corner case scenarios occur, the work machine may query the server end for additional instructions; e.g., as an "if-then" query transmitted to the server end over the network connection.

In addition to identifying and distributing software solutions to network-connected work machines, the server end may also continually collect feedback data from the work machines regarding performance metrics and operator satisfaction levels associated with the software solutions. Such data can then be utilized to train or modify existing software solutions and to identify gaps in the software solution database desirably closed by developing additional software solutions. This feedback data may be particularly beneficial when at least some of the software solutions assume the form of neural network algorithms or other machine learning algorithms. In this regard, the large pool of feedback data aggregated at the server end can be utilized to train highly-tailored neural network algorithms, while focusing the train data sets to relatively specific work task scenarios. Stated differently, the machine-server architecture or network allows training of the neural network algorithms utilizing relatively narrow, but deep data sets for improved performance benefits without detracting from the highly adapted nature of the neural network algorithms. To provide a specific, albeit arbitrary example (further discussed latter in this document), a neural network algorithm executed by a control system onboard a combine harvester and utilized to provide real-time assessments of grain quality for a rare crop type, such as purple wheat (which is currently experiencing a surge in commercial demand), can be trained with data collected from a moderate to large data set of combine harvesters also utilized to harvest purple wheat and, perhaps, matching other more refined aspects of the neural network algorithm.

An example of a machine-server architecture including a server end, a plurality of work machines, a communication network, and other devices or systems will now be described in conjunction with FIG. 1. Examples of software optimization processes performed by the server end, the network-connected work machines, or a combination of thereof are further described below in connection with FIGS. 2 and 3. After this, an example use case in which a network-connected work machine may request and implement (if available) an optimized software solution for usage in performing certain work tasks is presented below in conjunction with FIGS. 4 and 5. Lastly, examples of search trees that may be utilized to select an optimal-fit software solution supporting certain guidance functionalities are set-forth below in connection with FIGS. 6 and 7. By way of illustration, the network-connected work machines assume the form of agricultural work vehicles in the following example description. This notwithstanding, the teachings provided by the present disclosure are equally applicable to other types of work machines utilized in other industries, including the construction, forestry, and mining industries. Thus, the following description should be understood as merely providing a non-limiting example context in which embodiments of the present disclosure may be better understood.

Example Machine-Server Architecture and Methods for Network-Based Work Machine Software Optimization Turning now to the drawings and with initial reference to FIG. 1, there is shown an example machine-server architecture 10 suitable for carrying-out embodiments of the present disclosure. The machine-server architecture 10 includes a server end 12, which communicates with a plurality of work machines over a communications network 22. In the present example, the plurality of network-connected work machines includes at least four agricultural work vehicles 14, 16, 18, 20. However, as indicated by a symbol 24, the plurality of network-connected work machines may include any practical number of additional, non-illustrated work machines suitable for performing the below-described processes. Further, the work machines included within machine-server architecture 10 need not assume the form of agricultural work vehicles in all instances, but may include other work machines (both vehicular and non-vehicular) utilized within various other industries, such as the construction, mining, and/or forestry industries. It is, of course, also possible to develop multiple different machine-server architectures similar to that shown in FIG. 1, but specialized to a particular industry, vehicle type, or broad category of work task.

By way of example, one of the network-connected work machines 14, 16, 18, 20 (here, the network-connected work machine 14) is shown in greater detail in an upper left region of FIG. 1. This work vehicle 14 assumes the form of an agricultural harvester or combine in the illustrated example and is consequently referred to below as the "network-connected combine harvester 14." Similarly, as the work machines 14, 16, 18, 20 assume the form of agricultural work vehicles in the illustrated example, the work machines 14, 16, 18, 20 may be referred below to as the "network-connected work vehicles 14, 16, 18, 20." The remaining illustrated network-connected work vehicles 16, 18, 20 assume the form of a second agricultural combine, a self-propelled sprayer, and a tractor, respectively, in the illustrated embodiment. In actual practice, a relatively large number of work vehicles (e.g., several hundred, if not thousands of work vehicles) will be included within the machine-server architecture 10 and capable of bi-directional data exchange with the server end 12 through the network 22. Further, while several example network-connected work vehicles 14, 16, 18, 20 are illustrated in close proximity in FIG. 1, it will be appreciated that such the network-connected work vehicles may be distributed across a relatively broad geographical range, such as a country (the United States), multiple countries, or essentially most developed regions of the globe. While described as "network-connected," the network-connected work vehicles 14, 16, 18, 20 are not required to maintain a persistent network connection with the server end 12 at all times; rather, the network-connected work vehicles 14, 16, 18, 20 (and the other network-connected work machines described herein) need only be capable of establishing and maintaining a network connection with the server end 12 for durations of time sufficient to perform the processes set-forth herein.

The example network-connected combine harvester 14 will now be described in greater detail. While focusing on the network-connected combine harvester 14 as a useful example, the following description is equally applicable to the other network-connected work vehicles included in the machine-server architecture 10 including the illustrated network-connected work vehicles 16, 18, 20. Further, additional description of the example network-connected combine harvester 14 is provided below in connection with FIGS. 3-4, which jointly set-forth an example use case scenario in which the combine harvester 14 seeks a software solution from the server end 12 in the form of an optimal-fit grain quality assessment algorithm. It may be noted at this juncture, however, that the network-connected combine harvester 14 includes a primary body or mainframe 26, a cabin 28 located at a forward portion of the mainframe 28 and containing an operator station, and an interchangeable header 30 mounted to the feederhouse of the combine harvester 14. Further, the interchangeable header 30 assumes the form of a grain platform (hereafter, the "grain platform 30") well-suited for harvesting wheat and other cereal grains, with the example use case below pertaining to the grain assessment of wheat. The construction of the network-connected combine harvester enables the grain platform 30 to be readily interchanged with other types of headers better suited for harvesting other crop types, such as a corn head similar or identical to the corn head 104 shown as attached to the network-connected combine 16 in a lower portion of FIG. 1.

Describing the components of the network-connected combine harvester 14 in greater detail, a controller architecture 32 is operably coupled to a network interface 38, various onboard sensors 34, a network interface 38, one or more actuators 40, and a display device 42. Collectively, these components are referred to as forming a "combine control system 44" of the network-connected combine harvester 14. The various data connections between these components are represented by a number of signal lines terminating in arrowheads, with such signal lines generally representative of wired and/or wireless data connections. The controller architecture 32 of the combine control system 44 can assume any form suitable for performing the functions described throughout this document. Further, the term "controller architecture," as appearing herein, is utilized in a non-limiting sense to generally refer to the processing architecture or system of a network-connected work vehicle, another work machine, or another computing device or group of devices. The controller architecture 32 can encompass or may be corresponding to any practical number of processors, control computers, computer-readable memories, power supplies, storage devices, interface cards, and other standardized components. The controller architecture 32 may also include or cooperate with any number of firmware and software programs or computer-readable instructions designed to carry-out the various process tasks, calculations, and control/display functions described herein. Such computer-readable instructions may be stored within a non-volatile sector of a local memory 46, which is accessible to the controller architecture 32. Further, while generically illustrated in FIG. 1 as a single block, the memory 46 can encompass any number and type of storage media suitable for storing computer-readable code or instructions, as well as other data utilized to support the operation of the network-connected combine harvester. The memory 46 may be integrated into the controller architecture 32 in embodiments as, for example, a system-in-package, a system-on-a-chip, or another type of microelectronic package or module.

The onboard sensors 34 of the network-connected combine harvester 14 can include various different types of sensors for providing the controller architecture 32 with input pertaining to the operating parameters of the combine harvester 14, data pertaining to the surrounding environment of the combine harvester 14, and other such information useful in generating a software solution request in the manner described below. So too may the actuators 40 onboard the network-connected combine harvester 14 assume different forms for performing functions supporting harvester operation. Examples of the onboard sensors 34 and the actuators 40 are provided below in conjunction with FIGS. 3 and 4. The present example notwithstanding, the type and purpose of the sensors and actuators integrated into a particular network-connected work vehicle will differ significantly from work vehicle to work vehicle, as will many of the other components described below in connection with the example network-connected combine harvester 14. This stated, the onboard sensors 34 will commonly include some form of receiver, chip set, or the like for determining position utilizing a satellite navigation system including, but not limited to, GPS, Galileo, Global Navigation Satellite System (GNSS or GLONASS), Compass-IGS01, and combinations of the satellites included therein. For ease of reference, the term "GPS" is utilized herein to encompass all such satellite-based positioning systems. The onboard sensors 34 can also include cameras, temperature sensors, moisture sensors, wear sensors, vibration sensors, and/or sensors for measuring radio frequency (RF) signals, to list but a few examples.

The operator interface 36 of the network-connected combine harvester 14 can include any device or group of devices utilized by an operator to input commands into the combine control system 44 or otherwise control operational aspects of the combine harvester 14. The operator interface 36 may include, for example, a steering wheel, joysticks, levers, and other such manual controls positioned about the operator station located within the cabin 28 of the combine harvester 14. Additionally or alternatively, some portion of the operator interface 36 may be integrated into the display device 42 to varying extents. In this regard, the operator interface 36 may include physical inputs (e.g. buttons, switches, dials, or the like) located on or proximate the display device 42, a touchscreen module integrated into the display device 42, or a cursor input device (e.g., a joystick, trackball, or mouse) for positioning a cursor utilized to interface with GUI elements generated on the display device 42. Comparatively, the display device 42 can be any image-generating device configured for operation within the cabin 28 of the combine harvester 14. The display device 42 may be affixed to the static structure of the cabin 28 and realized in a head-down display (HDD) configuration in embodiments.

Finally, the network interface 38 of the combine control system 44 can be any device or module providing access to the network 22, such as a wireless (e.g., WiFi or cellular) transceiver or datalink including an antenna 48. Modern combine harvesters, and other modern agricultural vehicles, are now commonly equipped with such wireless transceivers to support telematics, so-called "precision ag" applications, and other related functions. Further, the network interface 38 can also include a satellite receiver and may receive data via a satellite link in certain instances. Additionally or alternatively, the network interface 38 may further permit communicate with nearby cellular towers or terrestrial nodes, such as a wireless RF nodes included in a controller area network (CAN) established over an agricultural area (e.g., a field or group of fields) within which the network-connected combine harvester 14 operates. Suitable equipment for usage as the network interface 38 includes the line of telematics receivers and transmitters commercially offered by Deere and Company, currently headquartered in Moline, Ill., and marketed under the brand name "JDLink™". Such examples notwithstanding, the particular form assumed by the network interface 38 may vary, providing that network interface 38 provides persistent or intermittent wireless conductivity to the network 22.

With continued reference to FIG. 1, the communications network 22 broadly encompasses any number and type of networks, systems, or architectures for transmitting data between the various components or nodes of the machine-server architecture 10 utilizing any common protocols and signaling schemes. These components or nodes include the network-connected work vehicles 14, 16, 18, 20, the server end 12, and possibly other network-connected data sources 50, such as weather data and ground condition data sources 52. The network 22 can include one or more open content delivery networks, Virtual Private Networks (VPNs), the Internet, cellular networks, and various other communications networks implemented in accordance with transmission control protocol/Internet protocol (TCP/IP) architectures or other conventional protocols. In various embodiments, the network 22 may further encompass one or more Local Area Networks (LANs), wide area networks (WANs), CANs, and similar wireless networks. In certain cases, wider networks (e.g., WANs or CANs) may be employed to provide network connectivity when a particular network-connected work vehicle 14, 16, 18, 20 is operating within a given field, orchard, or other agricultural space. In still other embodiments in which in-field connectivity may be non-existent, unreliable, or impractical for rapid data exchange, certain processes may be conducted during time frames in which a network-connected work vehicle is brought into range of a wireless network, such as a LAN or WAN, established in an area in which the work vehicle is stored when not in use.

The server end 12 can be implemented utilizing a cloud computing (distributed server) architecture in embodiments. Whether implemented utilizing a distributed server architecture, a localized server or server farm operating on the Internet, or in some other manner, the server end 12 provides software applications executing onboard the network-connected work vehicles 14, 16, 18, 20 access to servers, storage, databases, and other resources supporting the operation of such software applications. The server end 12 may be described as including a processor architecture 54 (e.g., one or more processors) and input/output (I/O) features 56. The I/O features 56 include, in turn, a network interface enabling connection to the network 22 and access to a memory storing at least one database 58, 60. In this latter regard, the server end 12 may and maintain a software solution database 58 in which a library of software solutions, which may include or consist of a plurality of software programs or algorithms, is stored. As indicated above, each software solution held within the database 58 is linked to or associated with a unique work vehicle task profile. In embodiments, the software solutions stored within the software solution database 58 may be arranged or sorted into different categories or classifications (as indicated by graphic 62), with the database 58 potentially containing any number of categories and sub-categories (as indicated by symbol 64). In certain instances, a given software solution can be a set of data parameters for entry into a program executed locally onboard a work vehicle included in the plurality of network-connected work vehicles 14, 16, 18, 20. In other instances, some or all of the software solutions stored within the database 58 may be software programs or applications, which are executed to support performance of a particular work task. Such software applications are advantageously, although not necessarily, realized as machine learning algorithms in embodiments; and may specifically include neural network algorithms, as further indicated in FIG. 1 by symbol 66 and discussed below.

Any number of additional databases 60 may also be accessed by the server end 12 and store data useful in performing embodiments of the below-described software optimization and distribution processes. For example, as indicated in FIG. 1, such additional databases 68 can include one or both of a geographical database and a work vehicle profile database. Addressing first the geographical database, this database may store geographically-referenced information describing historical or current meteorological conditions (e.g., atmospheric moisture levels, wind conditions, temperatures, due points, etc.), soil conditions, and other such data for different regions of the geographical area (e.g., the United States or another country) across which the network-connected work vehicles 14, 16, 18, 20 are distributed. The server end 12 may then access the geographical database to recall the appropriate geographical information corresponding to a task location in building search criteria utilized to search the software solution database 58 for an optimal-fit software solution matching a software solution request issued by any given one of the network-connected work vehicles, as described below in connection with FIG. 2. The geographical database may also be updated, as appropriate, utilizing data received from other network-connected data sources, such as one or more weather and soil condition data sources 52. Comparatively, the work vehicle profile database may store profile information for the various ones of the network-connected work vehicles 14, 16, 18, 20. Such profile information can describe the physical characteristics of the work vehicle, such as the make and model (or series number) of the work vehicle, any aftermarket modifications to the work vehicle, work vehicle operational age and usage history, and other such parameters. Operator preferences corresponding to a particular work vehicle may also be stored within this database in embodiments. Again, the server end 12 may then recall such information for usage in constructing search parameters to locate optimal-fit software solutions, as described below.

Figure 2:
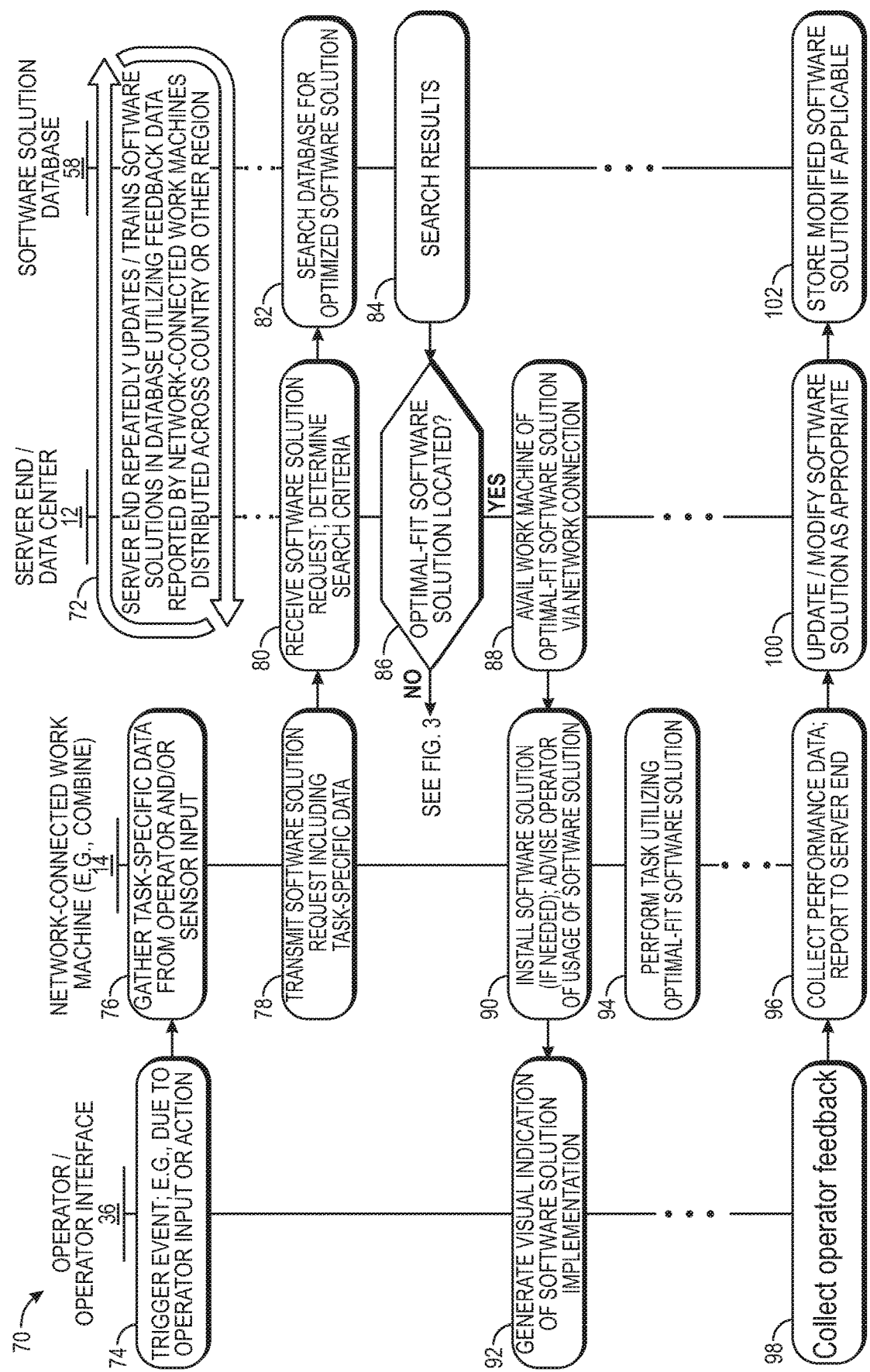
FIG. 2 is a signal timing diagram illustrating one manner in which a network-connected work machine may communicate with the example server end to carry-out embodiments of the work machine software optimization method.

Advancing to FIG. 2, an example signal timing diagram 70 is presented illustrating complementary processes suitably carried-out by the network-connected combine harvester 14 (or another network-connected work machine) and the server end 12 in embodiments of the present disclosure. Generally, the below-described processes are initiated by the occurrence of one or more trigger events. Such trigger events may occur at the network-connected combine harvester 14 and signal the desirability of generating a software solution request for transmission over the network 22 to the server end 12. During operation of the network-connected combined harvester 14, the controller architecture 32 may thus monitor for such trigger events, several examples of which are described below. Prior to this stage of the process occurring, however, the server end 12 modifies or updates the software solutions stored within the software solution database 58 on a repeated or iterative basis, as indicated in FIG. 2 by symbol 72. In this regard, the software solutions stored with in the software solution database 58 may be updated (e.g., neural network algorithms or other algorithms may be iteratively trained) utilizing feedback data received from the other network-connected work vehicles and aggregated at the server end 12. Further discussion of various approaches for modifying or training the software solutions within the software solution database 58 is set-forth below in connection with FIGS. 3-7. First, however, example processes during which the network-connected combine harvester 14 and the server end 12 may interact following issuance of a software solution request by the combine harvester 14 is discussed below in connection with FIGS. 3 and 4.

Referring jointly to FIGS. 1 and 2, at STEP 74 of the signal timing diagram 70 (FIG. 2), the controller architecture 32 of the network-connected combine harvester 14 detects the occurrence of a pre-defined trigger event. In embodiments, the trigger event may assume the form of operator input received via the operator interface 36 of the combine control system 44 indicating an operator desire for the provision of an optimized software solution. For example, in one possible scenario, an operator may interact with a GUI elements generated on a screen of the display device 42 to navigate to a GUI screen including a software optimization or calibration option. In response to operator selection of the calibration option, the controller architecture 32 may then generate a software solution request and transmit this request to the server end 12. In other instances, the operator may interact with the operator interface 36 or another device (e.g., a tablet executing a software application) to pre-plan a future work task. The pre-planning process may then initiate the transmission of a software solution request to the server end 12; e.g., for a software solution in the form of a tailored program or algorithm downloaded to the local memory 46 of the network-connected combine harvester in advance of the impending work task and, perhaps, during off-peak hours or another optimal download time.

In further embodiments, the controller architecture 32 of the combine control system 44 may monitor for a different trigger event at STEP 74 of the signal timing diagram 70 in lieu of or in addition the trigger events described above. For example, in the case of the network-connected combine harvester 14, detection of the attachment of the grain platform 30 or interchange of the grain platform 30 for another type of header (e.g., the corn head 104 shown as attached to the combine 16 in FIG. 1) may serve as the trigger event during STEP 74. In this latter case, the controller architecture 32 may automatically detect attachment of a new header or the operator may provide input via the operator interface 36 indicating that a different header type has been newly-attached to the combine harvester 14; and, in response to this determination, the controller architecture 32 may then seek a software solution specific to the newly-attached header type from the server end 12 by generating a corresponding software solution request transmitting to the server end 12 over the network 22. In still other instances, attachment of another type of interchangeable work implement to a different work vehicle (e.g., attachment of a tillage, row planter, or air seeder implement to a tractor) may serve as a trigger event detected by a network-connected work vehicle (e.g., the network-connected tractor 20) during STEP 74 of the example process.

In still further embodiments, the controller architecture 32 of the combine control system 44 may automatically monitor for a trigger event or condition occurring during usage of the network-connected combine harvester 14 as, for example, a background task. In one approach, when the network-connected combine harvester 44 is engaged in crop harvesting, the controller architecture 32 may repeatedly calculate a confidence factor or assuredness level that the currently-utilized grain assessment algorithm is the appropriate algorithm selection for the task at hand. In one approach, the controller architecture 32 may calculate such a confidence factor by comparing image data of the currently-processed grain material to image data associated with the currently-executed algorithm, such as the image data utilized to train the currently-executed algorithm. The controller architecture 32 may then arrive at a confidence factor or assuredness level indicating the degree of similarity between these two sets of image data. If the confidence factor falls below a predetermined threshold value, this may constitute a trigger event; and the controller architecture 32 may automatically (that is, without requiring user input) seek an optimized software algorithm from the server end 12. In other embodiments, the controller architecture 32 may repeatedly export such image data to the server end 12, which may periodically calculate such a confidence factor and then automatically query database 58 for an optimized software solution (to provide to the network-connected combine harvester 14) if the calculated confidence level falls below a minimum acceptable value. Various other automatic trigger events may also be monitored for by the controller architecture 32 at STEP 74 of the signal timing diagram 70 in embodiments. For example, in still other embodiments, the controller architecture 32 may repeatedly assess one or more performance metrics of a work machine; and, if the performance metric falls below a minimum acceptable value, the controller architecture 32 may then be triggered to automatically request an optimized software solution from the server end 12 in the manner described herein.

In response to detection of a trigger event (STEP 74, FIG. 2), the controller architecture 32 of the combine control system 44 advances to STEP 76 and gathers data describing the work task to be performed utilizing the network-connected combine harvester 14. Such task-specific data may be gathered utilizing data entered by an operator of the network-connected combine harvester 14, utilizing data retrieved from any of the sensors 34 onboard the combine harvester 14, by recalling data from the memory 46, or utilizing a combination of these sources. After collecting such task-specific data, the controller architecture 32 is then embeds or encapsulates this data in a software solution request, which is transmitted from the network-connected combine harvester 14 (via the network interface 38), over the network 22, and to the server end 12 (STEP 78). The informational items captured by the controller architecture 32 as task-specific data will vary depending upon the type of work vehicle on which the control system 44 is deployed, the nature of the work task, and other factors. In the agricultural context, the task-specific data may include data identifying the crop type currently subject to harvesting or processing, as determined by the controller architecture 32 utilizing sensor data or as indicated by operator input entered via the operator interface 36. Imagery (still images or video) may be captured by one or more cameras (included in the onboard sensors 34) of a material processed by the work vehicle during the work task. Imagery of the surrounding environment of the work vehicle, such as imagery of an agricultural space (e.g., a field or orchard) may also be included within the software solution request. Such imagery of the work vehicle's external environment may be particularly useful when the work task involves guided navigation of a work vehicle as may be the case when, for example, the software solution request seeks a task-specific obstacle avoidance or row following algorithm. Other data collected by sensors 34 onboard the network-connected combine harvester 14 may also be captured and transmitted to the server end 12 as part of the software solution request.

In addition to sensor data, machine-specific data pertaining to the work vehicle at issue (here, the network-connected combine harvester 14) may also be gathered by the controller architecture 32 and included as task-specific data within the software solution request. Such machine-specific data can include, for example, a VIN or other information uniquely identifying a work vehicle (e.g., the combine harvester 14) from which a software solution request originates. Additionally or alternatively, any such machine-specific data may identify the type or class of work vehicle at issue; e.g., expressed as, for example, a make, model, or series number of the work vehicle. Other historical information of the work vehicle may also be provided, if desired, such as the age (in operating hours) of the work vehicle or specific components onboard the work vehicle, the date and nature of recent repairs or part replacements, and other such information impacting work vehicle capabilities and performance. In the case of the network-connected combine harvester 14, as an example, such machine- or vehicle-specific information may be stored in the local memory 46 and recalled by the controller architecture 32 for incorporation into the software solution request during STEP 78 of the signal timing diagram 70. Such information may also be stored by the server end 12 in the work vehicle profile database 68 and then recalled by the server end 12 (e.g., utilizing machine-identifying information in the software solution request) during STEP 80. Still other bits of information may also be contained in the software solution request issued by the combine control system 44 during STEP 78 including other data entered by an operator describing the impending work task, such as the type of work task for which a software solution is sought, the location of the work task, and when the work task is performed. Time-stamp or geolocation data may also be contained in the software solution request or associated with the software solution request as metadata, with the server end 12 then considering such data in constructing the search criteria for scanning the software solution database 58 in the manner described below.

After receiving a software solution request from the network-connected combine harvester 14 (or other network-connected work machine), the server end 12 extracts relevant data from the software solution request to construct a set of search criteria for searching the database 58, as described below. However, for completeness, it is also noted that other preliminary steps may also be performed by the server end 12 prior to proceeding to construction of the search criteria. For example, security or handshake techniques, such as one-way or two-way authentication, transmission of digital certificates, and similar steps, may be performed to ensure data integrity. The server end 12 may also transmit an acknowledgement signal to the controller architecture 32, which may then generate a visual indication of the display device 42 conveying to the operator that the software solution request has been received by the server end 12. Such an acknowledgement signal may also be utilized to measure lag time or latencies within the network in evaluating whether a software program might reasonably be performed partially or predominately offboard the network-connected combine harvester 14, as further described below.

In building the search criteria, the server end 12 may supplement the data contained within the software solution request in at least some implementations. For example, and as previously mentioned, the controller architecture 32 may recall data from the work vehicle profile database (as included in the additional databases 68) in embodiments and consider such data in constructing the search criteria. This data may include information identifying a category or grouping into which the work vehicle falls (e.g., a make, model, or series), thus providing the opportunity for the server end 12 to search for software solutions specific to the identified category or grouping of the work vehicle (or other work machine). Similarly, information identifying the location of the work task may be utilized to search the geographical database (if included in the other databases 68) for data describing characteristics of the geographical region (e.g., soil types, current or historical weather conditions, indigenous crop types, etc.) in which the work task is performed. In certain embodiments, the geographical database or the work vehicle profile database 68 may also contain information specific to crop fields or other agricultural spaces associated with a particular work vehicle; e.g., stored as map data identifying the types of crops planted in different fields, data distinguishing planted or plantable regions of a field from other regions of a field (e.g., the headlands, vehicle or human pathways, or waterways), and other such information. As a still further possibility, the server end 12 may supplement the software solution request received during STEP 80 with data received from other network-connected data sources 50 in embodiments. For example, when applicable, current meteorological data may be collected from weather stations or similar meteorological data sources 52 in communication with the server end 12 through the network 22. Similarly, current data collected by the other network-connected work vehicles 16, 18, 20 may also be considered when applicable to the work task to which a software solution request applies. For example, information pertaining to local weather or soil conditions collected by other network-connected work vehicles 16, 18, 20 in a set vicinity (e.g., a 50 mile radius) of the work vehicle issuing the software solution request (e.g., the network-connected harvester 14) may also be utilized in constructing the search criteria.

Next, at STEP 82 of the signal timing diagram 70, the server end 12 searches the software solution database 58 for a software solution matching the search criteria (and thus corresponding to the task-specific data contained in the software solution request) to a degree sufficient to be considered an "optimal-fit software solution." As indicated above, the tolerance, confidence level, or sensitivity for deeming a software solution an optimal-fit will vary among embodiments and may be adjusted to operator preference, with such operator preferences included in the software solution request or stored in, for example, the work vehicle profile database. In less complex embodiments, a software solution may be required to match all primary search criteria (e.g., machine type, implement type, and crop type, as such criteria are applicable to the work task under consideration), while matching a certain percentage of secondary search criteria (e.g., machine series, crop varietal, season, geographic location, and so on) to be considered an optimal-fit. In more complex embodiments, various search criteria may be weighted, and a total score may be calculated by the server end 12 in determining whether an optimal-fit software solution is available within the database 58. In this latter approach, if the total score exceeds an upper predetermined threshold, the software solution may be deemed an optimal-fit software solution. Alternatively, if the total score is less than the upper predetermined threshold, but greater than a second, lower threshold, the software solution may be deemed an approximate-fit software solution for possible usage in performing the work task, as described in detail in connection with FIG. 3. Continuing this example, if the scores of all the software solutions are less than the second threshold, the server end 12 may determine that no optimal-fit or approximate-fit software solutions are currently available in the software solution database 58 and then provide a corresponding reply to the network-connected combine harvester 14 (or other work machine included in the machine-server architecture 10). Additional description of other search approaches potentially employed by the server end 12 when searching the software solution database 58 are set-forth below in connection with FIGS. 6 and 7.

Search results are received by the server end 12 at STEP 84 of the signal timing diagram 70. The server end 12 then determines whether an optimal-fit software solution matching the search criteria has been located in the software solution database 58 (STEP 86). If an optimal-fit software solution matching the search criteria is located within the software solution database 58, the server end 12 then takes certain steps or actions to avail the appropriate network-connected work machine (e.g., the combine harvester 14) of the optimal-fit software solution via the network connection (STEP 88), as described below. If, instead, an optimal-fit software solution is not located in the software solution database 58, the server end 12 may then transmit a corresponding signal or message to the controller architecture 32 indicating the lack of such an optimal-fit software solution corresponding to the task-specific data provided by the work vehicle; specifically, by the combine control system 44 of the network-connected combine harvester 14 in the illustrated example. The controller architecture 32 may then convey this information to the combine operator in some manner (e.g., by generating an appropriate message or other visual indication on the display device 42), and the process may terminate in embodiments. In other instances, as indicated in FIG. 2, the server end 12 may engage in a sub-process to determine if the operator of the network-connected combine harvester 14 would instead prefer to utilizing an approximate-fit software solution in lieu of an optimal-fit software solution, if such at least one approximate-fit software solution is located within the software solution database 58. An example of such an approximate-fit software solution sub-process is described below in connection with FIG. 3.

During STEP 88 of the signal timing diagram 70 (FIG. 2), the server end 12 avail the network-connected combine harvester 14 of the optimal-fit software solution if located within the database 58. In embodiments, the server end 12 may avail the network-connected combine harvester 14 by transmitting the software solution to the combine control system 44 for download to the local memory 46. Such a download may occur immediately or shortly after the optimal-fit software solution is located within the software solution database; or, if the start time of the work task permits, the network-connected combine harvester may schedule a download and installation for a subsequent time during, for example, off-peak usage hours or when the network-connected combine harvester has a persistent network (e.g., WiFi) connection. Alternatively, network connectivity and response times permitting, the server end 12 may partially or fully execute the software solution at the server location (or locations) remote from the combine harvester 14, with the server end 12 then providing output data (e.g., actuation, display, and/or navigation commands) to the network-connected combine harvester 14 over the network 22 on a real-time or near real-time basis. In this regard, an optimal-fit software solution may be availed to a particular network-connected work machine (e.g., the combine harvester 14) utilizing an SAAS approach, which may be beneficial in instances in which the software solution has relatively high processing demands, while network 22 latencies are relatively low. In still other instances, a blended approach may be taken in which an optimal-fit software solution is availed by server end 12 such that the software solution is performed by both the network-connected combine harvester 14 and the server end 12, to varying extents. For example, in certain embodiments, the network-connected combine harvester 14 may principally execute the optimal-fit software solution locally. However, when certain high processing load or corner case scenarios occur, the combine harvester 14 may query the server end 12 for additional instructions; e.g., submitted to the server end 12 as an "if-then" query. This latter approach may be useful when, for example, providing a navigation function as part of a work task and more complex navigational decisions arise.

As further indicated in FIG. 2 at STEPS 90, 94, the controller architecture 32 of the network-connected combine harvester 14 next carries-out any needed installation or software updates steps and then performs the work task utilizing the optimal-fit software solution. Prior to this, or concurrently, the controller architecture 32 may also generate a visual indication of the display device 42 advising the operator of the network-connected combine harvester 14 that an optimal-fit software solution is available from the server end 12 (back end service or data center) and will be utilized in performing the work task, per the earlier-generated software solution request. If the software solution assumes the form of a neural network algorithm or other algorithm that is relatively large in file size, the controller architecture 32 may download the software solution request to the local memory 46 of the network-connected combine harvester 14 at a scheduled time, if the start time of the work task so permits. The work task is then performed utilizing the network-connected combine harvester 14 during STEP 94 of the signal timing diagram 70 (FIG. 2). As noted above, in other implementations, the optimal-fit software solution may be executed principally offboard the network-connected combine harvester 14 by the server end 12, with the server end 12 then providing instructions or output data to the combine harvester 14 for usage in carrying-out the work task. For example, in implementations in which the optimal-fit software solution assumes the form of an optimal-fit neural network algorithm having an output layer (or such a neural network algorithm is included as part of a larger software solution), the server end 12 may avail the network-connected combine harvester 14 of the optimal-fit neural network algorithm by executing the neural network algorithm at the server end 12 and then repeatedly (e.g., in real-time) transmitting results from the output layer of the neural network algorithm over the network 12 to the network-connected combine harvester 14.

Feedback data is advantageously, although non-essentially collected during STEP 96 of the signal diagram 70 (FIG. 2), either iteratively during performance of a given work task or after completion of the work task. Such feedback data may include operator satisfaction ratings or other data entered into the combine control system 44 by an operator utilizing the operator interface 36 (STEP 98). Such data may also include sensor readings, as collected by the onboard sensors 34, reflective of an efficiency rating or other performance metric pertaining to the manner in which the network-connected combine harvester 14 completes the work task at hand. The feedback data is then provided to the server end 12, which then modifies the software solution as appropriate (STEP 100), with the modified software solution stored in the software solution database 58 (STEP 102). The feedback data may then be utilized to further refine or train the software solutions, as well as to identify gaps in the software solution library motivating the development of new software solutions. Notably, a relatively wide set or swath of feedback data can be collected due to the nature of the machine-network architecture 10 for aggregation at the server end 12, which may be in communication with hundreds, if not thousands of work vehicles of varying types over the network 22. Such an approach may be particularly advantageous in embodiments in which at least some of the software solutions are implemented as neural network algorithms or other machine learning algorithms. In this latter regard, leveraging such an expensive pool of feedback data allows neural network algorithms to receive highly specialized training, thereby adjusting the weights (strength) between neuron or node connections linking nodes in different layers of the network and other such parameters (e.g., inactivity biases), while still benefiting from relatively extensive (and continually evolving) data training sets. Stated differently, in embodiments in which some or all of the optimal-fit software solutions are realized as neural network (or other machining learning) algorithms, the server end 12 may collect feedback data from the network-connected combine harvester 14 during or following performance of the work task, aggregate such feedback data with feedback data received from additional work machines when performing similar work tasks utilizing the optimal-fit neural network algorithm, and then utilizing the aggregated feedback data to further train the optimal-fit neural network algorithm (essentially returning to PROCESS 72 in FIG. 2).

Figure 5:
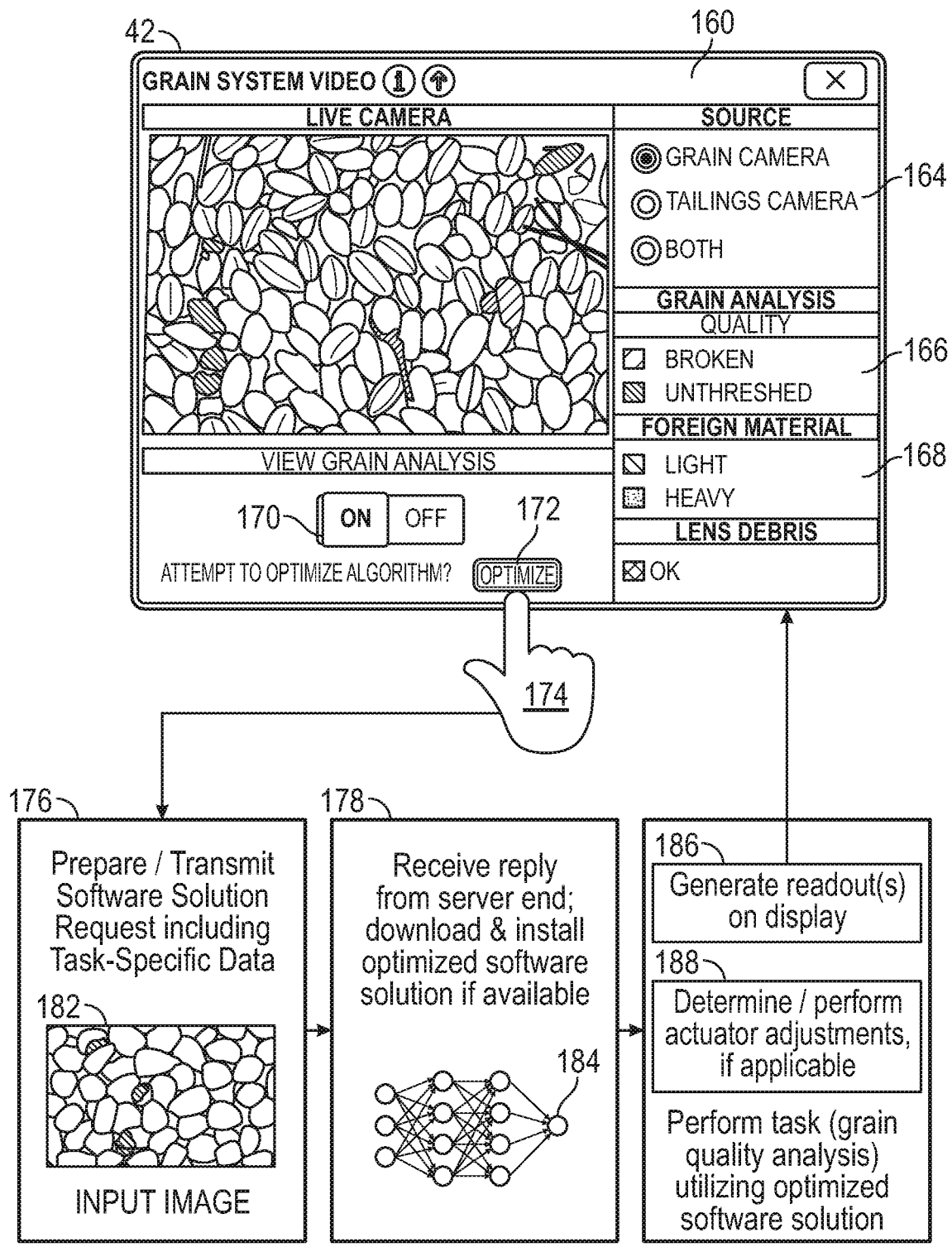
FIG. 5 schematically illustrates one manner in which an operator may interact with a graphical user interface (GUI) page or screen generated on a display device of the agricultural combine (FIG. 4) to trigger the generation of the software solution request for the optimized grain quality assessment algorithm.

At this juncture, it may be beneficial to generally note that the term "neural network algorithm," as appearing herein, refers to a computer-readable program having a structure composed of multiple layers of interconnected nodes or neurons. The particular structure of a neural network algorithm (when employed) will vary between embodiments of the present disclosure, noting that several types of neural network algorithms currently exist (including, for example, convolutional neural networks well-suited for image processing as pertinent to several of the work machine applications mentioned herein) and additional neural network types continue to be developed. Generally, and as schematically indicated in FIGS. 1 and 5, a neural network algorithm may include an input layer into which data is fed (e.g., imagery data captured by a camera or other sensor onboard a work vehicle), a final output layer at which processing results appear, and any number of hidden layers between the input and output layers. Each node contained in a given layer of the neural network algorithm may be connected to some, if not all of the nodes in a subsequent network layer, thereby forming a processing structure loosely akin to a biological neural network. Additionally, the behavior or performance of a neural network algorithm can be modified by adjusting certain parameters associated with the nodes and connections of the neural network, including the activation strength or "weight" between node-to-node connections and, in many cases, an inactivity bias assigned to each node. Through iteratively modifying such parameters using feedback data, the neural network algorithm can be trained to improve the algorithm performance; that is, the tendency of the algorithm to provide a correct or desired result across a range input data sets. Such training may be considered "machine learning" when largely automated by providing the neural network algorithm with feedback data (which may be expressed using cost functions, as an example), with the neural network algorithm or an associated algorithm iteratively adjusting the network parameters (e.g., node-to-node weights and inactivity biases) without reliance or with a reduced reliance on direct human programming, to gradually improve the performance of the neural network algorithm.

Additional discussion of neural network algorithms and other software solutions potentially stored in the software solution database 58 is provided below. First, however, additional description of approximate-fit software solutions is provided in connection with FIG. 3. Specifically, referring now to FIG. 3, there is shown an approximate-fit software solution subprocess 106 suitably carried-out by the controller architecture 32 in embodiments of the present disclosure. The approximate-fit software solution subprocess 106 includes a number of process STEPS 108, 110, 112, 114, 116, 118, 120, each of which is described below. Depending upon the particular manner in which the approximate-fit software solution subprocess 106 is implemented, each step generically illustrated in FIG. 3 may entail a single process or multiple sub-processes. Further, the steps illustrated in FIG. 3 and described below are provided by way of non-limiting example only. In alternative embodiments of approximate-fit software solution subprocess 106, additional process steps may be performed, certain steps may be omitted, and/or the illustrated process steps may be performed in alternative sequences.

The approximate-fit software solution subprocess 106 commences at STEP 108 in response to a determination by the server end 12 that an optimal-fit-software solution is not located in the software solution database 58. This corresponds to the "NO" path after decision STEP 86 in the signal timing diagram 70 of FIG. 2. In this case, the server end 12 next confers the search results received at STEPS 84, 86 of the signal timing diagram 70 (FIG. 2) to determine whether an approximate-fit software solution corresponding to the software solution request is instead available in the software solution database 58. If an approximate-fit software solution is also not found in the software solution database 58, the server end 12 proceeds to STEP 112 (FIG. 3) and transmits a corresponding message over the network 22 to the controller architecture 32 of the combine control system 44. This message instructs the combine-control system 44 (or, more broadly, the network-connected combine harvester 14) to generate a notification or message, as presented on a display screen of the display device 42, conveying to an operator that the software solution request cannot be fulfilled at present. The operator may then carry-out the work task utilizing the network-connected combine harvester 14 without benefit of an optimized-fit software solution. Alternatively, if a generalized or baseline algorithm is stored in the local memory 46 of the network-connected combine harvester 14, the control system 44 may execute the baseline algorithm by default when performing the work task.

If instead determining, at STEP 110, that an approximate-fit software solution is available within the software solution database 58, the server end 12 transmits an instructional message to the combine control system 44 (or, more broadly, the network-connected combine harvester 14) to generate a notification informing the operator of the availability of the approximate-fit software solution and inquiring whether the operator would like to utilize such an approximate-fit software solution in performing the work task (STEP 114) with the combine harvester 14 If multiple approximate-fit software solutions corresponding to the software solution request are located within the software solution database 58, the server end 12 may select the top candidate from the approximate-fit software solutions (e.g., as determined by a highest tabulated score or ranking) for usage in further performing subprocess 106. Alternatively, in embodiments, an operator may be permitted to select among the approximate-fit software solutions in such an instance by, for example, interacting with the combine control system 44 utilizing the display device 42 and the operator interface 36. If an operator elects not to proceed with the approximate-fit software solution at STEP 114 of the approximate-fit software solution subprocess 106 (e.g., via operator selection input received via the operator interface 36), the server end 12 proceeds to STEP 112 and terminates the subprocess 106. Conversely, if the operator instead inputs data approving usage of the approximate-fit software solution, the server end 12 proceeds to STEP 118 of the subprocess 106. In other implementations, and as indicated in FIG. 3 by path 117, the server end 12 may not seek operator approval (effectively skipping STEPS 114, 116) and proceed directly to availing the combine control system 44 with the approximate-fit software solution during STEP 118 of the subprocess 106.

Figure 3:
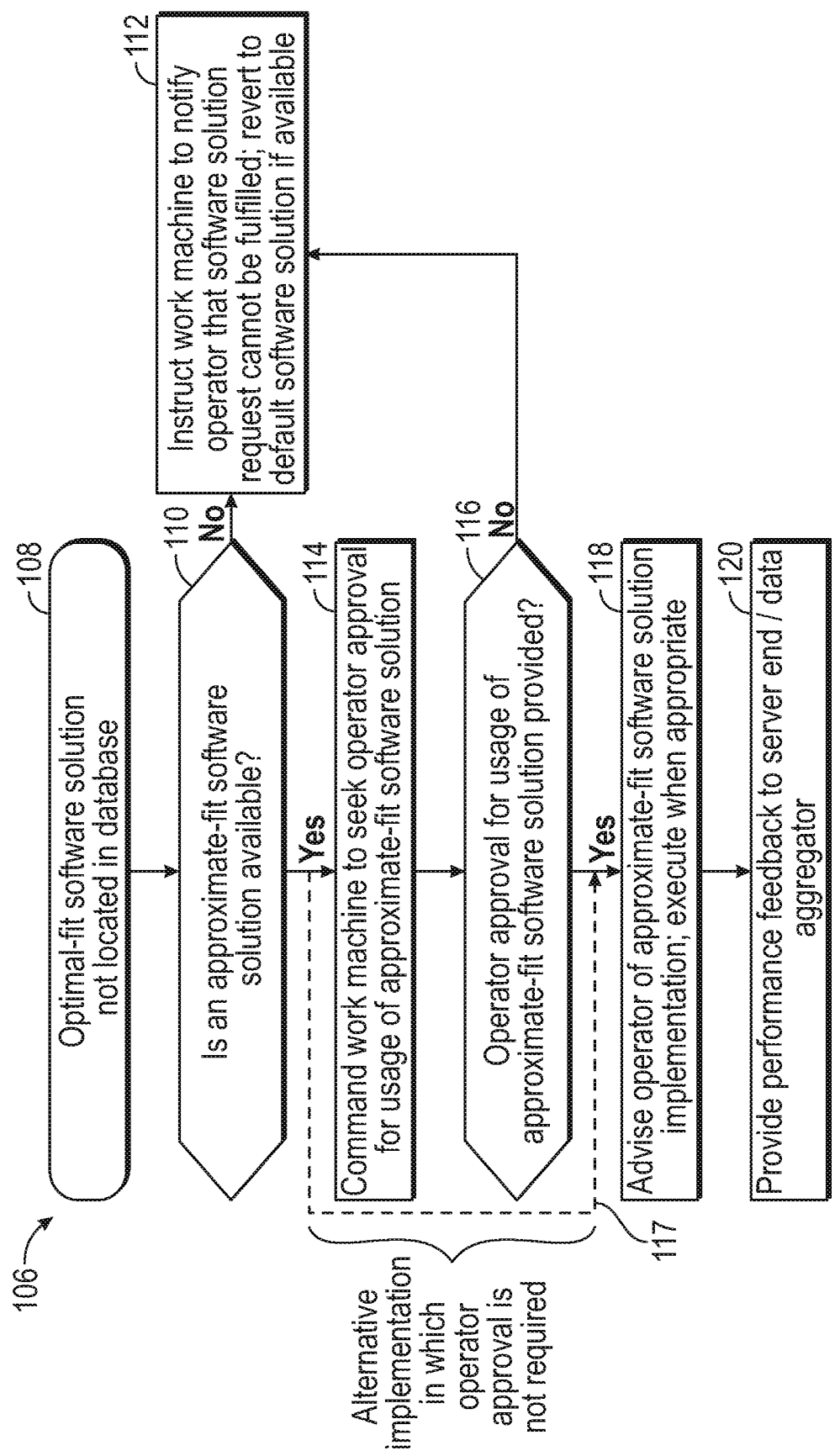
FIG. 3 is a flowchart illustrating an example subprocess carried-out by the server end and a network-connected work machine in instances in which an optimal-fit software solution corresponding to a software solution request is not located in the software solution database.

With continued reference to FIG. 3, at STEP 118 of the subprocess 106, the server end 12 transmits a message over the network 22 to the network-connected combine harvester 14 instructing the combine harvester 14 (or, more specifically, the controller architecture 32 of the combine control system 44) to advise the operator (e.g., via appropriate messages generated on the display device 42) that the approximate-fit software solution will be implemented. The network-connected combine harvester 14 then proceeds with usage of the approximate-fit software solution during the work task (STEP 118) in a manner akin to that described above in connection with usage of an optimal-fit software solution. In conjunction with this step, the server end 12 also avails the network-connected combine harvester 14 of the approximate-fit software solution; e.g., as described above, the server end 12 may transmit the approximate-fit software solution to the network-connected combine harvester 14 for download to the local memory 46 and/or the server end 12 may execute the approximate-fit software solution, in whole or in part, and then transmit appropriate output data to the combine harvester for usage during the work task. Lastly, at STEP 120, the network-connected combine harvester provides performance feedback to the server end 12 over the network 22. Again, such feedback may be provided on an iterative basis during the work task; or, instead, may be provided after completion of the work task by the work vehicle. Such feedback data may be particularly beneficial in evaluating the performance of approximate-fit software solutions and in developing new optimal-fit software solutions based on well-rated approximate-fit software solutions, as further discussed below.

Example Use Case: A Network-Connected Combine Harvester

Figure 4:
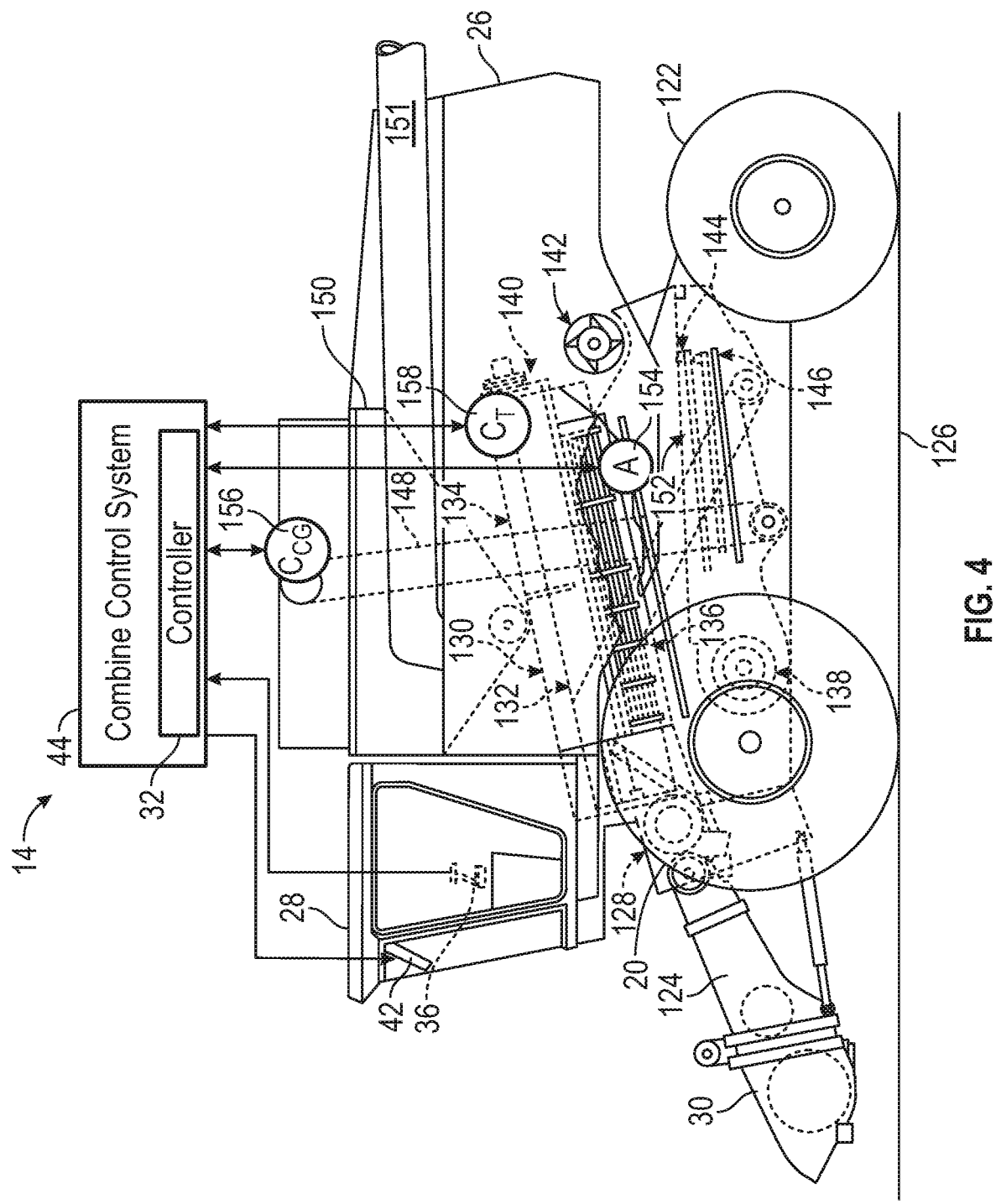
FIG. 4 is a schematic of a first example network-connected work machine in the form of a combine harvester including a combine control system, which may request an optimized grain quality assessment algorithm adapted for usage in evaluating a particular grain type processed by the combine harvester.

Referring now to FIG. 4, the example network-connected combine harvester 14 is illustrated in greater detail, with reference numerals carried-over from FIG. 1 where appropriate. The mainframe 26 of the combine harvester 14 is supported by a number of ground-engaging wheels 122. The ground-engaging wheels 122 are powered by a non-illustrated engine and drivetrain including, for example, an electronically-controlled hydraulic transmission. A feederhouse 124 is mounted to a forward portion of the mainframe 26 of the combine harvester 14 at an elevation generally below the cabin 28. As previously indicated, various harvesting heads or, more simply, "headers" are attachable to the feederhouse 124 in an interchangeable manner to allow customization of the combine harvester 14 for harvesting a particular type of crop. Currently, a grain platform 30 is attached to the feederhouse 124 suitable for harvesting wheat and other cereal grains.

As the combine harvester 14 travels over a field 126 in a forward direction, the grain platform 30 gathers severed crop plants into the feederhouse 124. The feederhouse 124 then consolidates the severed crop plants for conveyance (e.g., via a non-illustrated conveyor belt contained in the feederhouse 124) into the interior of the combine harvester 14. Within the combine harvester 14, crop plants are engaged by a rotating drum conveyor or "beater" 128, which directs the crop plants in a generally upward direction into a rotary threshing and separating section 130. The rotary threshing and separating section 130 can include various components for performing the desired functions of separating the grain and chaff from other plant material. The illustrated rotary threshing and separating section 130, for example, includes a rotor or drum 132 having threshing features and rotatably mounted in a case or rotor housing 134. Rotation of the threshing drum 132 within the rotor housing 134 causes both grain and chaff to fall through the separation grates of a concave 136 and into the inlet of a lower grain cleaning section 138. Concurrently, straw and similar material-other-than-grain (MOG) is directed toward an outlet end 140 of the rotary threshing and separating section 130 and is ultimately delivered to another rotating drum or "discharge beater" 142 for expulsion from an aft end of the combine harvester 14.

The lower grain cleaning section 138 of the combine harvester 14 includes various components adapted to clean the newly-harvested grain, while separating the chaff therefrom. Such components may include a chaffer 144, a sieve 146, and any number of fans (not shown). By action of the grain cleaning section 138, the newly-cleaned grain is directed into a clean grain elevator 148 for conveyance upwardly into a storage reservoir or clean grain tank 150 of the combine harvester 14. As the clean grain elevator 148 transports the newly-harvested grain into the clean grain tank 150, tailings fall onto a return elevator 152 extending across a lower portion of the clean grain elevator 148. The return elevator 152 then recycles the tailings back to the inlet of the thrashing drum 132 for further threshing to allow the above-described grain processing steps to repeat and maximize the grain yield of the combine harvester 14. In this manner, the combine harvester 14 intakes severed crop plants from the field 126, extracts grain from the crop plants, cleans the newly-extracted grain, and then stores the grain in clean grain tank 150 for subsequent unloading utilizing, for example, an unloading auger 151. Also, during usage of the combine harvester 14, certain components within the combine harvester 14 may be positionally adjusted or the operating parameters of such components may be modified utilizing any number of actuators 40 (FIG. 1), such as hydraulic- or electrically-controlled linear or rotary actuators, one of which is generically represented by symbol 154 in FIG. 4. Int this regard, the operational speeds of any number of fans or conveyor belts may be varied, as may the position of any number of non-illustrated deflectors, chaffer components, sieve components, or the like.

In the schematic of FIG. 4, two cameras are illustrated as integrated into the network-connected combine harvester 14: a clean grain camera 156 (represented by symbol $C_{CG}$) and a tailings camera 158 (represented by symbol $C_T$). The cameras 156, 158 may be considered part of the generically-illustrated sensors 34 shown in FIG. 1, with each camera 156, 158 operably coupled to the controller architecture 32 by a wired or wireless connection. The clean grain camera 156 is positioned to a capture a live video stream of the clean grain stream transported by the clean grain elevator 148 into the clean grain tank 150; e.g., as indicated in FIG. 4, the clean grain camera 156 may be positioned near an upper portion or the outlet end of the clean grain elevator 148. Comparatively, the tailings camera 158 is positioned to capture a live video feed of the tailings stream, which is ultimately discharged through the outlet end 140 of the rotary threshing and separating section 130; e.g., the tailing camera 158 may be integrated into the rotor housing 134 (shown) or positioned along the return elevator 152 in embodiments. The imagery collected by the cameras 156, 158 is provided to the controller architecture 32 for usage in assessing grain quality and generating a corresponding display on the display device 42, as described below. While the following description focuses on imagery collected by the cameras 156, 158, it will be appreciated that other sensors for detecting electromagnetic energy, such as radio frequency energy, impinged against the grain and other material processed by the combine harvester 14 can also be utilized in further implementations.

Turning to FIG. 5, there is shown an example of a grain assessment display 160 suitably generated on the display device 42 within the cabin 28 of the combine harvester 14. The grain assessment display 160 includes a live video feed region 162 in which video from one or both of the cameras 156, 158 may be presented, depending upon operator selection by interaction with the GUI options appearing under the SOURCE selecting region 164. Visual indication of grain quality on the display 160 may activated or deactivated by operator interactions with a GUI element 170; here, a virtual slider or toggle switch. In the present example scenario, an operator has activated the visual indications of grain quality, which are expressed as color coding of the imagery within the live video feed region 162 of the grain assessment display 160. Specifically, as indicated in the grain analysis quality area 166 of the grain assessment display 160, areas of the live video feed region 162 containing broken or unthreshed grain may be color coded in first and second colors (e.g., orange and purple, respectively) represented by first and second cross-hatch patterns in FIG. 5. Similarly, as indicated in the foreign material region 168 of the display 160, foreign material visual detected within the live video feed region 162 may be color coded in a third color (represented by a third cross-hatch pattern) if lighter (e.g., capable of being blown away by a fan) or color coded in a fourth color (represented by a fourth cross-hatch pattern) if heavier in weight. In further embodiments, additional visual indications of grain quality, such as numerical readouts of grain quality, moisture content, weight, and other parameters, may be generated on the grain assessment display 160 in addition to or in lieu of such a live image color overlay approach.

To determine which regions of the live video feed are appropriately color coded in accordance with the established color coding scheme, the controller architecture 32 of the combine control system 44 may perform a real-time or on-the-fly visual analysis of the video feeds captured by the cameras 156, 158 utilizing a specialized algorithm stored in the memory 46. However, the accuracy which with such an algorithm is able to perform such a grain quality analysis may be dependent upon the type of grain currently processed by the combine harvester 14 and other factors. As such, it may benefit the grain assessment process to enable the combine control system 44 to seek an optimal-fit software solution in the form of a grain assessment algorithm best suited for the particular task conditions of the agricultural combine 14 at a given point in time. In the example of FIG. 5, an operator may trigger the generation of a software solution request for an optimized grain quality assessment algorithm by selection of the GUI element (a virtual button) 172 appearing at the bottom of the display 160. This may be particularly useful when the combine harvester 14 is utilized to process grains or crop plants having distinct characteristics; or less common varieties of grain, such as purple wheat to provide an example.

When the virtual button 172 is selected by an operator (indicated by touch icon 174), the following steps are performed by the combine control system 44 of the network-connected combine harvester 14. First, at FUNCTION 176, the controller architecture 32 gathers the task-specific data pertinent to the current grain assessment task. Such data may specify the material currently processed by the network-connected combine harvester 14, here the type the class of wheat processed by the combine harvester 14: whether hard red winter, hard red spring, soft red winter, durum, hard white, or soft white wheat, or another less common variety of wheat, such as purple wheat. The controller architecture 32 may determine the class of wheat currently processed by the combine harvester 14 utilizing sensor data or by operator input. In other instances, the combine harvester 14 may be utilized to harvest a different type of grain or crop (e.g., oats, rye, barley, corn, sorghum, soybeans, flax, sunflowers, or canola), and a similar approach may be followed. The controller architecture 32 also includes other relevant information in the software solution request. This additional information may include imagery 182 (still pictures or live video feed) captured by one or both of the cameras 156, 158. Information indicating the type of header currently attached to the combine harvester 14 and/or information uniquely identifying the combine harvester 14 may also be included in the software solution request. So too may various other types of sensor data. The software solution request is then transmitted to the server end 12 and a response is received, providing an adequate network connection can be established. If unable to establish a network connection with the server end 12, the controller architecture 32 of the combine control system 44 may instead to revert or default to usage of a generalized baseline algorithm stored in the local memory 46 during the current grain assessment task. The controller architecture 32 may then periodically check to determine if network connectivity can subsequently be established to enable transmission of the software solution request to the server end 12 at a later point in time.

When the server end 12 is able to transmit a software solution request over the network 22 and to the server end 12, the software solution request may specifically seek an optimal-fit (e.g., convolutional) neural network algorithm in the illustrated example and other examples in which image processing (or sound processing) is involved. Such a neural network algorithm may be well-suited for recognizing patterns within the imagery data captured by the cameras 156, 158 to distinguish grain and chaff from inorganic MOG and other materials. Again, such a neural network algorithm (if located within the software solution database 58) can be downloaded to the network-connected combine harvesters 14 for local execution; or, instead, executed at the server end 12, with output layer results then forwarded to the combine harvester 14 if network connectivity permits (also potentially allowing for a slight time delay in the image 162 presented on the display 160). In still other instances, a different trigger event may initiate the generation of the software solution request at STEP 176, such as the attachment of a particular header to the combine harvester 14; e.g., if detecting the attachment of a corn header, the controller architecture 32 may automatically (without requiring user input) request an optimal-fit algorithm for analyzing the grain quality of corn from the server end 12 in embodiments.

Providing the server end 12 indicates that an optimal-fit software solution is available, the controller architecture 32 then utilizes the software solution (grain assessment algorithm) in the generation or continued generation of the grain assessment display 160. Specifically, at FUNCTION 178 (FIG. 4), the controller architecture 32 may download the optimized grain quality assessment algorithm (e.g., a neural network algorithm 184) to local memory, such as the memory 46 shown in FIG. 1. The controller architecture 32 then executes the optimized grain quality assessment algorithm in continued generation of the display 160 (FUNC- TION 180). Execution of the grain quality assessment algorithm may result in generation of the above-described visual indications of grain quality on the display 160, as indicated in FIG. 4 by box 186. Additionally, in embodiments, the controller architecture 32 may perform certain actuation adjustments (via one or more of the actuators 40, 154) in response to changes in the grain quality metrics determined utilizing the software solution. In still other embodiments, and as noted above, the optimal-fit software solution may be executed offboard the network-connected combine harvester 14 to some extent; or the optimal-fit software solution may assume the form of a set of optimized parameters for entry into a software application executed onboard the combine harvester 14. In this latter case, for example, a specific set of data parameters for entry into the data fields of a software program (e.g., specifying various aspects of the grain to be processed, local soil conditions, and the like) may be transmitted by the server end 12, over the network 22, and to the controller architecture 32 of the combine harvester 14, along with instructions for the controller architecture 32 to automatically input or "auto-fill" the optimized parameters into the software application prior to performance of the work task by the combine harvester 14.

Database Search Tree Examples

The foregoing has thus provided multiple examples of scenarios in which a network-connected work machine may beneficially request a task-optimized algorithm or other software solution from the server end 12 over the network 22. When receiving such a request, the server end 12 may search the software solution database 58 utilizing various different techniques, with examples provided above. Such search techniques will vary among embodiments; however, for completeness, the following will now describe two "search tree" techniques that may be employed by the server end 12 to scan the software solution database 58 and select an optimal-fit software solution supporting certain guidance functionalities in at least some implementations of the present disclosure.

Figure 6:
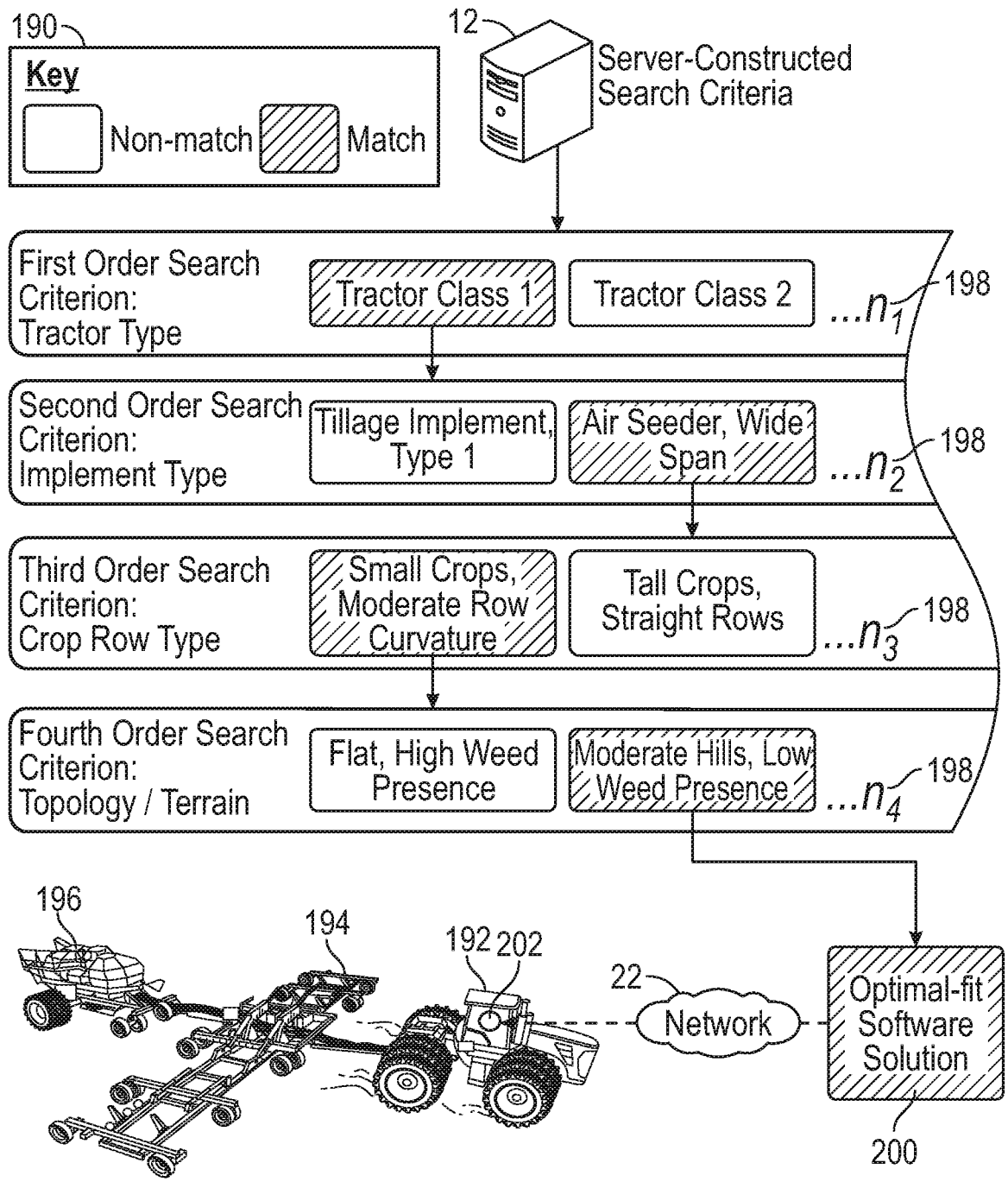
FIG. 6 illustrates a search tree (partially shown) utilized by the server end in searching the software solution database in an example scenario in which an agricultural work vehicle (here, a manned tractor towing an implement) requests an optimized neural network algorithm supporting a crop row following function.

Referring first to FIG. 6, an example search tree 190 is presented for usage by the server end 12 in searching the software solution database in an example scenario. Specifically, in this example scenario, a manned, network-connected tractor 192 towing at least one implement (here, an air seeder implement 194 in a train arrangement with a commodity cart 196) requests an optimized neural network algorithm supporting a crop row following function. For simplicity of explanation, only four tiers or layers of search criteria are presented in the example of FIG. 6. Further, only two categories or selection options are presented in each tier of the search tree 190; however, as indicated by symbols 198, any practical number of categories can be contained in each search layer or tier of the tree 190. Here, the first tier of the search tree 190 pertains to (or sorts by) tractor classification, the second tier pertains to the type of implement towed (or otherwise moved) by the tractor 192, the third tier pertains to the crop row type subject to processing, and the fourth tier pertains to the nature of the topology and terrain (including ground cover) in which the crop rows are located. Again, such information may be determined by the server end 12 by data extracted from the software solution request received from the network-connected tractor 192, as well as from data collected from other sources including from a geographical database (which may describe the topology of the filed at issue) and/or a work machine profile database (which may describe physical characteristics of the tractor 192 considered during the first tier of the search tree 190). In embodiments in which the tractor 192 is equipped with a vision system (as will typically be the case when the software solution request seeks a navigational algorithm), the software solution request may also contain imagery (still images or a video feed) of the tractor's surrounding environment, as captured by one or more cameras within the vision system.

If an adequate match is found at each stage or tier of the search tree 190, the server end 12 may identify a software solution 200 associated with the final match as the optimal-fit software solution corresponding to the current software solution request. Accordingly, the server end 12 may then avail the tractor control system 202 onboard the tractor 192 of the optimal-fit software solution, as indicated in the lower portion of FIG. 6. The tractor control system 202 may subsequently utilize the optimized row following algorithm in performing the work task; e.g., in planting or sowing seeds within the row crop field utilizing the air seeder 194. Notably, if the server end 12 is unable to establish an adequate match with the search criteria at the fourth tier, but is able to establish matches for the previous higher level tiers (here, the first through third tiers), the server end 12 may then select another software solution (row following algorithm) associated with a different, non-matching classification or category within the fourth tier and offer usage of this software solution (row following algorithm) to the network-connected tractor 192 as an approximate-fit software solution, as previously described. Further, if the operator of the network-connected tractor 192 accepts usage of the approximate-fit software solution, and if the operator and/or the tractor 192 provide feedback indicating that the approximate-fit software solution performed adequately well, the approximate-fit software solution may then be utilized by the server end 12 to develop an optimal-fit software solution filling this gap within the software library stored in the software solution database 58 (FIG. 1).

Figure 7:
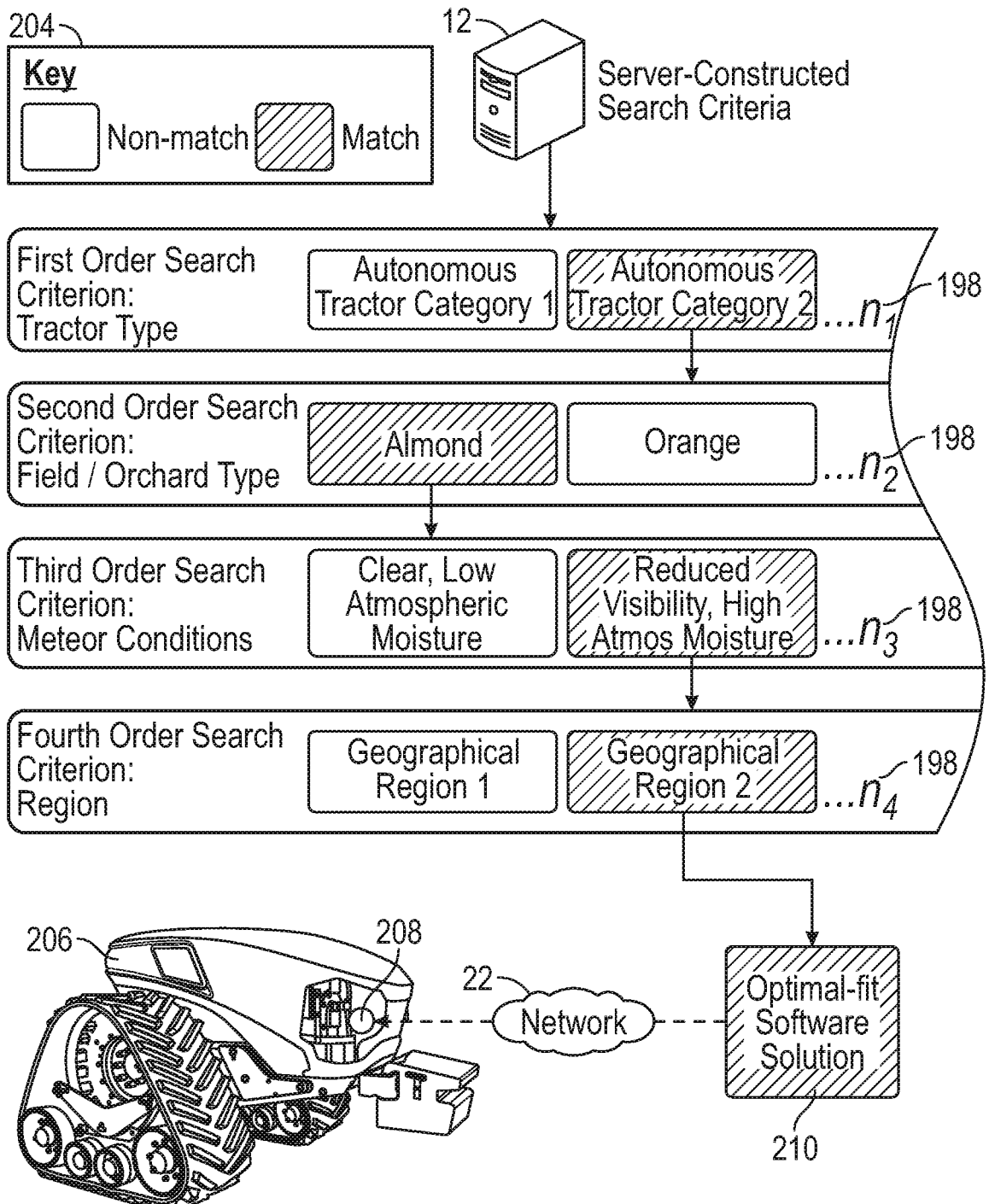
FIG. 7 illustrates a search tree (partially shown) utilized by the server end in searching the software solution database in an example scenario in which an agricultural work vehicle (here, an autonomous tractor) requests an optimized neural network algorithm supporting autonomous field or orchard operations.

Turning lastly to FIG. 7, a second search tree 204 is presented, which is suitably utilized by the server end 12 in searching the software solution database in an example scenario in which an autonomous tractor 206 (or another autonomous work vehicle) requests an optimized neural network algorithm supporting autonomous field or orchard operations. Once again, the server end 12 may construct the search criteria utilizing data extracted from the software solution request issued by a control system 208 onboard the autonomous tractor 206, as well as data obtained from other network-connected sources (e.g., other network-connected work vehicles and meteorological sources 50) if applicable. If matches are located at all tiers of the search tree 204, the server end 12 may then arrive at an optimal fit software solution 210, which is then transmitted to the tractor control system 208 or otherwise availed to the autonomous tractor 206 via network 22 as indicated in the drawing figure. Again, the autonomous network-connected tractor 206 may include image data captured by one or more cameras located onboard the tractor 206 and included in a vision system in the software solution request, and the tractor 206 may seek an optimized neural network algorithm for performing vision analysis of the video feeds in assisting autonomous navigation of the tractor 206 through a particular agricultural environment.

In the above-described manner, the autonomous network-connected tractor 206 can request and typically receive a highly-tailored autonomous orchard/field navigation algorithm for a first optimized algorithm for a first task conducted at a particular time (e.g., if the tractor 206 operates in an almond field during a particular day or week) and for another optimized algorithm for a different task conducted at a subsequent time (e.g., if the tractor 206 operates an orange orchard on another day or week). Further, algorithm performance can be maintained as the tractor 206 as intelligent algorithms are extended to different crop and work scenarios, while the tractor 206 (or other network-connected work machine) transitions between different operating circumstances. Further, such an algorithm can be performed either onboard the autonomous tractor 206 itself or, instead, performed by the server end 12 offboard the autonomous tractor 206, with the server end 12 then transmitting navigational instructions or commands to the autonomous tractor 206 as appropriate. Such an approach can also be scaled such that the server end 12 controls (or provides overriding commands when needed) multiple autonomous work vehicles operating within a given orchard, field, or other agricultural space, while coordinating the movements or actions of the autonomous work vehicles.

Default Software Solutions

As indicated above, embodiments of the present disclosure are beneficially utilized in conjunction with generalized baseline software solution or algorithms stored in local memory on the network-connected work machines. In this case, a particular network-connected work machine can execute a baseline software algorithm by default if the work machine is unable to retrieve an optimal-fit software algorithm (or, if applicable, an approximate-fit software algorithm) from the server end due to issues with network connectivity or a lack of such an optimal-fit software algorithm within the software solution database 58. Additionally, a network-connected work machine can default or revert to the baseline software algorithm if determining that, during performance of a work task, a particular optimal-fit software algorithm (or other currently-executed algorithm) experiences unexpectedly poor performance.

Consider further the example scenario introduced above in connection with FIGS. 1-5. A generalized baseline grain assessment algorithm, such as a generalized neural network grain assessment algorithm, may be loaded onto the memory of the combine control system 44 during, for example, initial manufacture of network-connected combine 14, with back-end server 12 periodically updating the baseline algorithm over network 22 if desired. The baseline grain assessment algorithm may be sufficiently generally to function acceptably well over a wide range of crop types including multiple wheats, corn, soybeans, and so on. During or prior to the performance of a particular grain harvesting task, the controller architecture 32 may still request an optimized grain assessment algorithm in response to occurrence of any of the trigger events described above; e.g., in an attempt to retrieve a software model better customized for soft white wheat, hard red wheat, purpose wheat, or another grain type. However, if such an optimized software solution is unavailable within the software solution database 58 or cannot be provided to the combine control system 44 due to network connectivity issues, the controller architecture 32 may instead utilize the generalized baseline grain assessment algorithm by default. Similarly, the controller architecture 32 may also revert to the baseline grain assessment algorithm if unexpectedly poor performance is encountered when executing an optimal-fit grain assessment algorithm, if the above-described confidence factor falls below a minimum acceptable value, or if an operator provides input indicating reversion to the baseline grain assessment algorithm is desired.

An analogous approach can also be employed for other network-connected work machines in determining when to execute generalized, baseline algorithms (or other software solutions) stored in local memory on a given network-connected work machine. As a further example, in the case of the network-connected manned tractor 192 shown in FIG. 6, the tractor control system 202 may store a generalized or baseline row following algorithm within local memory. The tractor control system 202 may then executed the baseline row following algorithm if an optimized row following algorithm cannot be obtained from the server end 12 due to an omission within the software solution database 58 or due to a network connectivity issue. Additionally, the tractor control system 202 may transition from executing an optimal-fit row following algorithm to a baseline row following algorithm if the optimal-fit row following algorithm performs poorly or an operator indicates that a reversion to the baseline algorithm is desired. Finally, so too can the tractor control system 208 of network-connected autonomous tractor 206 (FIG. 7) store a baseline autonomous navigation algorithms in local memory and execute the baseline algorithms when an optimized navigation algorithm is unavailable (due to an omission within the software solution database 58 or due to a network connectivity issue) or an optimized algorithm is desirably deactivated (e.g., due to poor performance).

Enumerated Examples of Methods for Network-Based Work Machine Software Optimization The following examples of methods for providing network-based work machine software optimization are further provided and numbered for ease of reference.

1. In embodiments, a method for optimizing work machine performance is carried-out utilizing a server end in communication with a plurality of work machines over a network. In such embodiments, the method may include the steps or processes of: (i) storing, in a memory accessible to the server end, a software solution database containing a plurality of software solutions corresponding to different work machine task profiles; (ii) receiving, at the server end, a software solution request transmitted over the network from a first work machine included in the plurality of work machines, the software solution request including task-specific data collected by the first work machine and pertaining to a work task to be performed utilizing the first work machine; and (iii) searching the software solution database for an optimal-fit software solution corresponding to the task-specific data. If locating an optimal-fit software solution within the software solution database, the server end (iv) avails, via the network connection, the first work machine of the optimal-fit software solution for usage by the first work machine when performing the work task. If instead not locating an optimal-fit software solution within the software solution database, the server end (v) transmits a message over the network and to the first work machine indicating that an optimal-fit software solution is unavailable.

2. The method of example 1, wherein availing includes transmitting the optimal-fit software solution from the server end, over the network, and to the first work machine for download to a local memory of the first work machine.

3. The method of example 1, wherein the optimal-fit software solution includes optimized parameters for entry into a software application executed onboard the first work machine. The server end transmits instructions along with the optimal-fit software solutions to the first work machine, the instructions commanding a controller architecture onboard the first work machine to automatically input the optimized parameters into the software application prior to performance of the work task.

4. The method of example 1, wherein the optimal-fit software solution assumes the form of an optimal-fit neural network algorithm having an output layer. Further, the step or process of availing includes one of: (i) transmitting the optimal-fit neural network algorithm to the first work machine for download to a local memory thereof, and (ii) executing the optimal-fit neural network algorithm at the server end and transmitting results from the output layer over the network to the first work machine.

5. The method of example 1, wherein the optimal-fit software solution assumes the form of an optimal-fit neural network algorithm. Additionally, the method further includes the steps or processes of: (I) collecting feedback data from the first work machine during or following performance of the work task by the first work machine in accordance with the optimal-fit neural network algorithm; (ii) aggregating the feedback data from the first work machine with feedback data received from additional work machines included in the plurality of work machines when performing work tasks utilizing the optimal-fit neural network algorithm; and (iii) utilizing the aggregated feedback data to further train the optimal-fit neural network algorithm.

6. The method of example 1, wherein the task-specific data includes sensor data collected by the first work machine and transmitted over the network to the server end for usage in locating an optimal-fit software solution in the software solution database.

7. The method of example 6, wherein the sensor data is indicative of a type of crop harvested utilizing the first work machine.

8. The method of example 6, wherein the sensor data includes imagery of a material processed by the first work machine.

9. The method of example 6, wherein the sensor data includes at least one of imagery of a work environment of the first work machine or other sensor data pertaining to the work environment of the first work machine.

10. The method of example 1, wherein the task-specific data includes at least one of the form of machine-specific data describing physical characteristics of the first work machine or implement-specific data describing physical characteristics of a work implement attached to the first work machine.

11. The method of example 1, wherein the first work machine assumes the form of a work vehicle having an operator interface. The task-specific data includes input data entered by an operator of the work vehicle via the operator interface and describing parameters of the work task.

12. The method of example 1, wherein the first work machine assumes the form of an agricultural work vehicle, the work task involves a crop row following function performed by the agricultural work vehicle, and the task-specific data describes one or more physical characteristics of the crop rows.

13. The method of example 1, wherein the first work machine assumes the form of a combine harvester, the work task involves evaluating grain quality of a grain processed by the combine harvester, and the task-specific data includes data describing a grain type processed by the combine harvester during the work task.

14. The method of example 1, wherein the first work machine includes a work vehicle to which different types of work implement can be attached. The task-specific data includes data identifying a work implement currently attached to the work vehicle.

15. The method of example 1, further including the steps or processes of: (i) if not locating an optimal-fit software solution within the software solution database, further searching the software solution database for an approximate-fit software solution corresponding to the task-specific data; (ii) if locating an approximate-fit software solution, transmitting a message over the network and to the first work machine instructing the work machine to request operator permission for usage of the approximate-fit software solution; and (iii) in response to receipt of a reply message from the first work machine indicating that operator permission has been granted, availing via the network connection the first work machine of the approximate-fit software solution for usage by the first work machine when performing the work task.

CONCLUSION

The foregoing has thus disclosed embodiments of a work vehicle systems and methods for providing network-based work machine software optimization through the development and provision of optimal-fit software solutions to work vehicles and other work machines. Through such systems and methods, highly adapted software solutions may be distributed to network-connected work machines on an as-needed basis to enhance work machine performance and efficiency, while reducing operator workload in many instances. Embodiments of the present disclosure can be implemented utilizing existing hardware and systems onboard work vehicles and other machines to facilitate customer adoption at minimal cost. Additionally, through the usage of a server end acting as a data center or aggregator, embodiments of the server end may aggregate relatively deep and wide data sets useful in training machine learning algorithms maintained within a software solution database and further useful in identifying in which current software solutions are ideally developed to meet customer needs. While principally described above in the agricultural context by way of non-limiting illustration, embodiments of the systems and methods are equally applicable to work machines utilized in other industries, including the mining, forestry, and construction industries.

As will be appreciated by one skilled in the art, aspects of the disclosed subject matter can be described in terms of methods, systems (e.g., control or display systems deployed onboard or otherwise utilized in conjunction with work machines), and computer program products. With respect to computer program products, in particular, embodiments of the disclosure may consist of or include tangible, non-transitory storage media storing computer-readable instructions or code for performing one or more of the functions described throughout this document. As will be readily apparent, such computer-readable storage media can be realized utilizing any currently-known or later-developed memory type, including various types of random access memory (RAM) and read-only memory (ROM). Further, embodiments of the present disclosure are open or "agnostic" to the particular memory technology employed, noting that magnetic storage solutions (hard disk drive), solid state storage solutions (flash memory), optimal storage solutions, and other storage solutions can all potentially contain computer-readable instructions for carrying-out the functions described herein. Similarly, the systems or devices described herein may also contain memory storing computer-readable instructions (e.g., as any combination of firmware or other software executing on an operating system) that, when executed by a processor or processing system, instruct the system or device to perform one or more functions described herein. When locally executed, such computer-readable instructions or code may be copied or distributed to the memory of a given computing system or device in various different manners, such as by transmission over a communications network including the Internet. Generally, then, embodiments of the present disclosure should not be limited to any particular set of hardware or memory structure, or to the particular manner in which computer-readable instructions are stored, unless otherwise expressly specified herein.

Finally, as used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A method for optimizing work machine performance carried-out utilizing a server end in communication with a plurality of work machines over a network, the method comprising:
    storing, in a memory accessible to the server end, a software solution database containing a plurality of software solutions corresponding to different work machine task profiles;
    receiving, at the server end, a software solution request transmitted over the network from a first work machine included in the plurality of work machines, the software solution request including task-specific data collected by the first work machine and pertaining to a work task to be performed utilizing the first work machine;
    searching the software solution database for an optimal-fit software solution corresponding to the task-specific data;
    if locating an optimal-fit software solution within the software solution database, availing via the network connection the first work machine of the optimal-fit software solution for usage by the first work machine when performing the work task; and
    if not locating an optimal-fit software solution within the software solution database, transmitting a message over the network and to the first work machine indicating that an optimal-fit software solution is unavailable.

2. The method of claim 1, wherein availing comprises transmitting the optimal-fit software solution from the server end, over the network, and to the first work machine for download to a local memory of the first work machine.

3. The method of claim 1, wherein the optimal-fit software solution comprises optimized parameters for entry into a software application executed onboard the first work machine; and
    wherein the server end transmits instructions along with the optimal-fit software solutions to the first work machine, the instructions commanding a controller architecture onboard the first work machine to automatically input the optimized parameters into the software application prior to performance of the work task.

4. The method of claim 1, wherein the optimal-fit software solution comprises an optimal-fit neural network algorithm having an output layer; and
    wherein availing comprises one of: (i) transmitting the optimal-fit neural network algorithm to the first work machine for download to a local memory thereof, and (ii) executing the optimal-fit neural network algorithm at the server end and transmitting results from the output layer over the network to the first work machine.

5. The method of claim 1, wherein the optimal-fit software solution comprises an optimal-fit neural network algorithm; and
    wherein the method further comprises:
        collecting feedback data from the first work machine during or following performance of the work task by the first work machine in accordance with the optimal-fit neural network algorithm;
        aggregating the feedback data from the first work machine with feedback data received from additional work machines included in the plurality of work machines when performing work tasks utilizing the optimal-fit neural network algorithm; and
        utilizing the aggregated feedback data to further train the optimal-fit neural network algorithm.

6. The method of claim 1, wherein the task-specific data comprises sensor data collected by the first work machine and transmitted over the network to the server end for usage in locating an optimal-fit software solution in the software solution database.

7. The method of claim 6, wherein the sensor data identifies a type of crop harvested utilizing the first work machine.

8. The method of claim 6, wherein the sensor data comprises imagery of a material processed by the first work machine.

9. The method of claim 6, wherein the sensor data comprises at least one of imagery of a work environment of the first work machine or other sensor data pertaining to the work environment of the first work machine.

10. The method of claim 1, wherein the task-specific data comprises at least one of machine-specific data describing physical characteristics of the first work machine or implement-specific data describing physical characteristics of a work implement attached to the first work machine.

11. The method of claim 1, wherein the first work machine comprises a work vehicle having an operator interface; and
    wherein the task-specific data comprises input data entered by an operator of the work vehicle via the operator interface and describing parameters of the work task.

12. The method of claim 1, wherein the first work machine comprises an agricultural work vehicle;
wherein the work task comprises a crop row following function performed by the agricultural work vehicle; and
wherein the task-specific data describes one or more physical characteristics of the crop rows.

13. The method of claim 1, wherein the first work machine comprises a combine harvester;
wherein the work task comprises evaluating grain quality of a grain processed by the combine harvester; and
wherein the task-specific data comprises data describing a grain type processed by the combine harvester during the work task.

14. The method of claim 1, wherein the first work machine comprises a work vehicle to which different types of work implements can be attached; and
wherein the task-specific data comprises data identifying a work implement currently attached to the work vehicle.

15. The method of claim 1, further comprising:
if not locating an optimal-fit software solution within the software solution database, further searching the software solution database for an approximate-fit software solution corresponding to the task-specific data;
if locating an approximate-fit software solution, transmitting a message over the network and to the first work machine instructing the work machine to request operator permission for usage of the approximate-fit software solution; and
in response to receipt of a reply message from the first work machine indicating that operator permission has been granted, availing via the network connection the first work machine of the approximate-fit software solution for usage by the first work machine when performing the work task.

16. The method of claim 1, further comprising:
identifying, at the server end, a geographical area in which the work task is performed; and
when searching the software solution database, searching for an optimal-fit software solution based, in part, on the identified geographical area.

17. The method of claim 1, further comprising:
extracting, at the server end, data identifying the first work machine;
utilizing the data identifying the first work machine to recall machine-specific information from a profile stored in a work machine profile database accessible to the server end; and
further utilizing the machine-specific information to locate the optimal-fit software solution when searching the software solution database.

18. A work machine utilized in conjunction with a server end in communication with a plurality of work machines over a network, the work machine comprising:
an operator station;
an operator interface located within the operator station;
a display device operable within the operator station;
a controller architecture coupled to the operator interface and to the display device;
a network interface coupled to the controller architecture and enabling the controller architecture to communicate with the server end over the network; and
a memory storing computer-readable instructions that, when executed by the controller architecture, cause the work machine to:
monitor for a trigger event initiating generation of a software solution request;
when detecting the trigger event, utilize the network interface to transmit a software solution request over the network and to the server end, the software solution request including task-specific data pertaining to a work task performed utilizing the work machine;
in response to transmission of the software solution request, receive a reply message from the server end indicating whether an optimal-fit software solution corresponding to the task-specific data is available from the software solution database; and
if the reply message indicates that an optimal-fit software solution corresponding to the task-specific data is available, utilize the optimal-fit software solution during performance of the work task.

19. The work machine of claim 18, wherein the computer-readable instructions, when executed by the controller architecture, further cause the work machine to:
execute a baseline algorithm stored in the memory if the work machine is unable to retrieve an optimal-fit software solution from the server end.

20. The work machine of claim 18, wherein the computer-readable instructions, when executed by the controller architecture, further cause the work machine to:
calculate a confidence factor associated with an algorithm when executed by the controller architecture as the work machine performs the work task; and
if the confidence factor falls below a predetermined threshold, either (i) transmit a software solution request to the server end for an optimal-fit software solution or (ii) transition to execution of a baseline algorithm stored in the memory of the work machine.

* * * * *